(12) United States Patent
Li et al.

(10) Patent No.: US 12,541,527 B2
(45) Date of Patent: *Feb. 3, 2026

(54) METHODS FOR ENABLING DATA ANALYTICS SERVICE AT SERVICE LAYER

(71) Applicant: IPLA Holdings Inc., New York, NY (US)

(72) Inventors: Xu Li, Plainsboro, NJ (US); Qing Li, Princeton Junction, NJ (US); Sneha Aman Singh, Issaquah, WA (US); Rocco Di Girolamo, Laval (CA); Catalina Mihaela Mladin, Hatboro, PA (US); Hongkun Li, Malvern, PA (US); Chonggang Wang, Princeton, NJ (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,309

(22) Filed: May 20, 2024

(65) Prior Publication Data

US 2024/0394270 A1  Nov. 28, 2024

Related U.S. Application Data

(63) Continuation of application No. 16/096,498, filed as application No. PCT/US2017/029335 on Apr. 25, 2017, now Pat. No. 12,026,167.

(Continued)

(51) Int. Cl.
*G06F 16/2458* (2019.01)
*G06F 9/54* (2006.01)
(Continued)

(52) U.S. Cl.
CPC .......... *G06F 16/2465* (2019.01); *G06F 9/541* (2013.01); *G06F 9/547* (2013.01);
(Continued)

(58) Field of Classification Search
CPC .. G06F 16/2465; G06F 16/955; G06F 16/958; G06F 16/86; G06F 9/541;
(Continued)

(56) References Cited

U.S. PATENT DOCUMENTS

2012/0029710 A1* 2/2012 Dodderi ............... H04Q 9/00 700/286
2015/0370872 A1* 12/2015 Raghavan ........ G06F 16/9027 726/5

(Continued)

FOREIGN PATENT DOCUMENTS

CN  102187328 A  9/2011
CN  102523246 A  6/2012
(Continued)

OTHER PUBLICATIONS

"https://www.quora.com/What-is-the-architecture-of-Google-Analytics", Downloaded on Apr. 8, 2020, 3 pages.
(Continued)

*Primary Examiner* — Joshua Bullock
(74) *Attorney, Agent, or Firm* — XSENSUS LLP

(57) ABSTRACT

A common Data Analytics Service (DAS) at service layer is designed to use underlying existing/future data analytics technologies or tools and provide them to service layer entities that need those data analytics operations with uniform access approach. A general operation framework/interface design is used for enabling DAS and the operation details within DAS. Related procedures for interacting with DAS, including the new parameters in service layer request/response messages can be used.

20 Claims, 33 Drawing Sheets

Related U.S. Application Data

(60) Provisional application No. 62/326,881, filed on Apr. 25, 2016.

(51) Int. Cl.

| | | |
|---|---|---|
| *G06F 16/84* | (2019.01) | |
| *G06F 16/955* | (2019.01) | |
| *G06F 16/958* | (2019.01) | |
| *G06Q 30/0201* | (2023.01) | |
| *H04L 67/63* | (2022.01) | |

(52) U.S. Cl.
CPC ............ *G06F 16/86* (2019.01); *G06F 16/955* (2019.01); *G06F 16/958* (2019.01); *G06Q 30/0201* (2013.01); *H04L 67/63* (2022.05); *G06F 2216/03* (2013.01)

(58) Field of Classification Search
CPC ..... G06F 9/547; G06F 2216/03; H04L 67/63; G06Q 30/0201
USPC .......................................................... 707/776
See application file for complete search history.

(56) References Cited

U.S. PATENT DOCUMENTS

| | | | |
|---|---|---|---|
| 2016/0112487 A1 | 4/2016 | Wang et al. | |
| 2023/0401588 A1* | 12/2023 | Levin | G06Q 30/0205 |

FOREIGN PATENT DOCUMENTS

| | | |
|---|---|---|
| CN | 104937552 A | 9/2015 |
| CN | 105430494 A | 3/2016 |
| CN | 105493525 A | 4/2016 |
| KR | 10-2015-0066474 A | 6/2015 |
| KR | 10-1696101 B1 | 1/2017 |
| KR | 10-1812398 B1 | 12/2017 |
| WO | 2014/190186 A1 | 11/2014 |
| WO | 2015/196177 A1 | 12/2015 |
| WO | 2016/044581 A1 | 3/2016 |

OTHER PUBLICATIONS

OneM2M Technical Specification TS-0001 V2.3.0, "Functional Architecture", Aug. 2015, 352 pages.

OneM2M Technical Specification TS-0001 V2.8.0, "Functional Architecture", Mar. 2016, 430 pages.

OneM2M Technical Specification TS-0007 V0.3.0, "Service Component Architecture", Jun. 2014, 105 pages.

SAP HANA Blog, "Big Data for Enterprise Customers Leveraging Hadoop Distributed File System and SAP Real Time Data Platform", Aug. 29, 2012, 5 pages.

Sultan R.A et al., "A spatial incremental relaying-based user transparent ARQ protocol," 2013 IEEE 14th Workshop on Signal Processing Advances in Wireless Communications (SPAWC), 2013, pp. 550-554.

Yingjie Hong et al., "TS0001-V2.8.0—Functional Architecture", ARC-2016-0215-TS-000I_FUNCTIONAL_ARCHITECTURE-V2_8_0.ZIP, ONEM2M, vol. WG2—Architecture, ARC, no. conference = ARC 22.1, Mar. 31, 2016-Mar. 31, 2016 Mar. 29, 2016 , pp. 1-430.

* cited by examiner

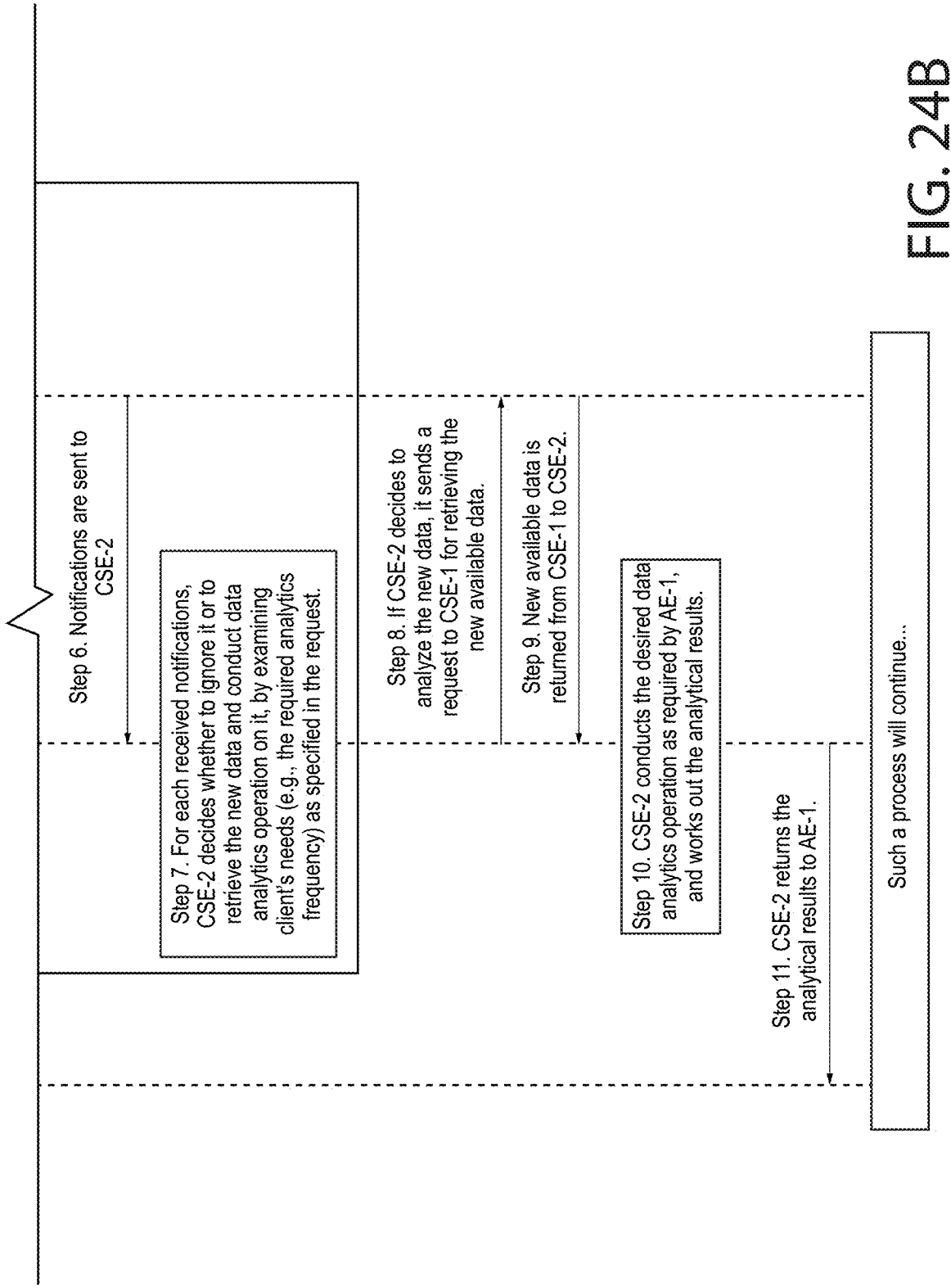

Control and Monitoring Panel

Selected types of data analytics operation: *Image processing*

Selected data items in the STP: *All*

CSE_ID: *IN-CSE-001*

Identifiable_Object: *Sky, Road Surface*

Analytical_Aspects: *Weather (for sky), Traffic (for road surface)*

Average Image Size for Analysis: *820 KB*

Avg_Processing_Time: *Less than 0.5s*

Service_Availability: *99.99% available*

Analytic Result Confidence interval: *95%*

Raw_Data_FormatIdentifiable_Object: *JPEG, PNG*

Control and Monitoring Panel

Please input which types of data analytics operation (or corresponding STPs) you intend to check:

Please input which data items you intend to see for each related STP:

If you also want to see which clients are using those STPs respectively, please select:

Submit

METHODS FOR ENABLING DATA ANALYTICS SERVICE AT SERVICE LAYER

CROSS-REFERENCE TO RELATED APPLICATIONS

This application is a continuation of U.S. patent application Ser. No. 16/096,498, filed Oct. 25, 2018, which is a National Stage Application filed under 35 U.S.C. 371 of International Application No. PCT/US2017/029335 filed Apr. 25, 2017, which claims the benefit of U.S. Provisional Patent Application Ser. No. 62/326,881, filed Apr. 25, 2016, the disclosures of which are hereby incorporated by reference in their entireties.

BACKGROUND

In recent years, the amount of data in our world has been exploding. Google processes hundreds of Petabytes (PBs) of searching data and Facebook generates over 10 PBs of log data per month (survey on big data systems, SCIENCE CHINA Information Sciences, 2015). As a result of the explosive global data, the term "big data" has been coined to describe enormous datasets. Compared with traditional datasets, big data can include massive unstructured data which needs to be analyzed in order to gain an in-depth insight from this data, e.g. how to discover potential buys from customers' shopping history records.

Mckinsey & Company has a more formal definition of big data as follows: "Big data shall mean such datasets which could not be acquired, stored, and managed by classic database software". This definition includes two connotations:

Dataset volumes that conform to the measurements/criteria of big data are changing, and may grow over time or with technological advances. At present, big data generally ranges from several Terabytes to several Petabytes.

Dataset volumes that conform to the standard of big data in different applications differ from each other.

Another popular definition of big data, which refers to several "Vs" (as shown in FIG. 1):

Volume means, with the generation and collection of masses of data, data scale becomes increasingly big, e.g., the data generated by Internet companies can easily reach ten of PBs per day as mentioned in the earlier example.

Variety indicates the various types of data, which include semi-structured and unstructured data such as audio, video, webpage, and text, as well as traditional well-defined structured data like database tables.

Velocity means the timeliness of big data, specifically, data collection and analysis, etc. must be quick and done in a timely manner, so as to maximize the commercial value of big data.

Value means there is useful knowledge/insights hidden in the data but in very low density.

In addition, More "Vs" can be defined, e.g.: Veracity deals with uncertain or imprecise data, etc.

Currently, industries are becoming more interested in the high potential of big data due to the potential new business and values, and many government agencies as well as the academia community have announced major plans to accelerate big data research and applications.

It is worth noting that the emergence of Internet-of-Things (IoT), which typically refers to, for instance, sensors and devices embedded in the physical world and connected by networks to computing resources, is a major trend driving the growth in big data.

As shown in FIG. 2, McKinsey research projects that the number of connected IoT nodes deployed in the world is expected to grow at a rate exceeding 30 percent annually. Some of the growth sectors are expected to be utilities, as these operators install more smart meters and smart appliances; health care, as the sector deploys remote health monitoring; retail, which will eventually increase its use of radio frequency identification (RFID) tags; and the automotive industry, which will increasingly install sensors in vehicles.

The value chain of big data can be generally divided into four phases: data generation, data acquisition, data storage, and data analysis (see FIG. 3). If we take data as a raw material, data generation and data acquisition are an exploitation process, data storage is a storage process, and data analysis is a production process that utilizes the raw material to create new value. Below, a brief introduction for each of those four phases is presented.

Data generation is the first step of big data. As mentioned earlier, huge amount of data is generated. For example searching entries, Internet forum posts, chatting records, and microblog messages. Moreover, large-scale data, of complex and highly diverse nature, can be generated through distributed data sources. Such data sources include sensors, videos, clickstreams, and/or all other available data sources, especially from IoT/M2M systems.

Data acquisition is the second phase of the big data system. Big data acquisition includes data collection, data transmission, etc. During big data acquisition, efficient transmission mechanisms are needed in order to send data to a proper storage management system to support different analytical applications. The collected datasets may sometimes include a significant amount of redundant or useless data, which unnecessarily increases storage space and affects the subsequent data analysis. For example, high redundancy is very common among datasets collected by sensors for environment monitoring. Data compression technology can be applied to reduce the redundancy.

The third phase, i.e., big data storage, refers to the storage and management of large-scale datasets while achieving reliability and availability of data accessing. Typically, it deals with massive, scalable and generally distributed storage systems. On one hand, the storage infrastructure needs to provide a scalable and reliable information storage service; on the other hand, it must provide a powerful access interface for query and analysis of a large amount of data.

The fourth stage is about data analysis. The analysis of big data mainly involves analytical methods applied to the collected data. Data analysis is the most important phase in the value chain of big data, with the purpose of extracting useful values, providing insights in business operations, etc. Different levels of potential values can be generated through the analysis of datasets in different fields. Therefore, it is worth noting that data analysis is a broad area or concept, which frequently changes and is extremely complex as exampled in FIG. 3.

A number of existing data analytics products on the market are briefly discussed below. These products are not necessarily associated with the service layer concept.

Google Analytics is a free web analytics service offered by Google that tracks and reports website traffic. Google Analytics is implemented with "page tags", and relies on the proprietary Google Analytics Tracking Code (currently known as Analytics.js), which is a snippet of JavaScript code that the website owner adds to every page of the website. Then, the tracking code runs in the client browser when the client browses the page if JavaScript is enabled in the browser. The code collects visitor data and sends it to a Google data collection server. The users first register and setup a user account in Google Analytics platform. The details of the user account will also be included in the Analytics.js code so that the data collected by the tracking code could be sent to the correct user account. FIG. 4 shows the general architecture of Google Analytics.

Currently, Google Analytics provides analytics services for three different application scenarios:
1) Websites and web apps, which use the above-mentioned analytics.js for collecting user behavior data on websites or web apps (as shown in FIG. 4);
2) Mobile apps, which utilize the APIs or sample codes provided by Google Analytics for collecting various data about mobile apps running on Android or iOS platforms;
3) Other application scenario, Google Analytics also provides a Measurement Protocol for any entity (e.g., an IoT device) to send data to Google Analytics server.

A step further, in addition to data collected by Google Analytics, it is also possible to find deep/hidden insights when mining the data from multiple sources such as corporate databases, or Customer Relationship Management (CRM) systems. Accordingly, now Google delivers Google Analytics Premium and Google BigQuery integration. By automatically importing logs from Google Analytics Premium to Google BigQuery, users can easily write SQL queries to correlate their website visitor activities with other valuable business data such as point-of-sale records, online purchase history, and user sign-in logs. Using this combined insight into their customers, users can then generate customized Ad Remarketing data for Google AdWords and DoubleClick.

IBM recently announced Watson Analytics, a natural-language-based data analytics product. Watson Analytics offers users the benefit of advanced analytics without the complexity. For instance, it allows non-expert people, to conduct various data analysis assisted by Watson analytics, e.g., from loading data, exploring data, making prediction on data, and enabling effortless dashboard and infographic creation for virtualizing analytical results. In the meantime, it allows users to analyze their uploaded data by just typing questions in human understandable natural language, and a natural language processing agent in Watson Analytics will automatically suggest desirable analytics tasks to the users.

FIG. 5 shows a snapshot of IBM Watson Analytics. It is worth noting that the targeted customers of this product are human users, and that it is not specifically designed for supporting data analytics in M2M/IoT scenario, which is the focus in this work.

Besides the above Watson analytics, IBM also has another type of product called Watson Developer Cloud, which is a proprietary collection of REST APIs and software development kits (SDKs) that use Artificial Intelligence technology to conduct more complicated analytics tasks. FIG. 6 shows the available data analytics services provided by Watson Developer Cloud. For example, for the Visual Recognition service, a user may send an HTTP request to an analytics endpoint with an image in the payload based on the API specification provided by Watson Cloud. The Visual Recognition service will analyze the visual appearance of the image by using machine learning technology, and return the user with the analytical results containing a list of the possible content depicted in the image, and a confidence level associated with each of these possibilities.

Microsoft Azure is a cloud computing platform and infrastructure, created by Microsoft, for building, deploying, and managing applications and services through a global network of Microsoft-managed and Microsoft partner hosted datacenters. In particular, Azure provides several different types of services related to data analytics, such as Microsoft Machine Learning Service, Stream Analytics, as well as HDInsight. The architecture of data analytics-related services used by Microsoft Azure is shown in FIG. 7, and it is highly related to M2M/IoT scenario since most of data in M2M/IoT systems will be data streams. Below we provide a brief introduction for each of those data analytics services.

Microsoft Azure Machine Learning Service: In general, machine learning uses computers to run predictive models that learn from existing data in order to forecast future behaviors, outcomes, and trends. Azure Machine Learning is a powerful cloud-based predictive analytics service that makes it possible to quickly create and deploy predictive models as analytics solutions. Azure Machine Learning provides tools for creating complete predictive analytics solutions in the cloud: Quickly create, test, operationalize, and manage predictive models and the users do not need to buy any hardware nor manually manage virtual machines. It is worth noting that, this service is still targeted for human professionals to facilitate their machine learning related tasks.

Microsoft Azure Stream Analytics: The Stream Analytics service provides low latency, highly available, scalable complex event processing over streaming data in the cloud. Azure Stream Analytics is a cost effective real-time event processing engine that helps to unlock deep insights from data. Microsoft Azure Stream Analytics makes it easy to set up real-time analytic processing on data streaming from devices, sensors, web sites, social media, applications, infrastructure systems, and more (similar products developed by other companies include SQLstream and IBM InfoSphere Streams, etc.). For example, with a few clicks in the Azure portal, a user can author a Stream Analytics job by specifying the input source of the streaming data, a data analytic processing task expressed in a SQL-like language, and the output sink for the results of this job. Compared to the previous Machine Learning Service (which focuses more on the traditional way for conducting predictive analytics in terms of batch processing, i.e., the data first gets collected together before getting processed), streaming analytics paradigm emphasizes more on conducting data analytics operation on-the-fly, i.e., the data gets analyzed as they flow through the data analytics engine.

Microsoft HDInsight: Apache Hadoop is an open-source software framework written in Java for distributed storage and distributed processing of very large data sets on computer clusters built from commodity hardware (see more details in a later section). It is the de-facto large-scale data processing infrastructure for big data related applications. Accordingly, many companies build their various data analytics related services on top of Hadoop framework (i.e., the Hadoop system is the backend infrastructure). Also, in order to facilitate those professionals who intend to work with Hadoop, many companies provide cloud based Hadoop distribution in the sense that it deploys and provisions Apache Hadoop clusters in the cloud, providing a software framework designed to manage, analyze, and report on big data-related tasks with high reliability and availability, such as Microsoft HDInsight (i.e., users do not need to buy any hardware nor manually manage virtual machines or any other resources, they just need to realize those by utilizing services provided by HDInsight Service provided by Microsoft Azure cloud platform).

Besides the above data analytics services provided by the major software companies (although some of them are not directly designed for M2M/IoT scenario), there are also some IoT-oriented platforms which may be equipped with certain data analytics capabilities.

The Intel IoT Platform is an end-to-end reference model and family of products from Intel, which works with third party solutions to provide a foundation for seamlessly and securely connecting devices, delivering trusted data to the cloud, and delivering value through analytics. In particular, Intel provides a cloud-based analytics system for IoT that includes resources, provided by the Intel IoT Developer Kit, for the collection and analysis of sensor data. Using this service, IoT developers have the ability to jump-start data acquisition and analysis without having to invest in large-scale storage and processing capacity.

FIG. 8 shows the general architecture of Intel IoT Analytics, in which its IoT Developer Kit allows users to configure the edge devices (e.g., Intel's Galileo/Edison devices) and send data to the centralized cloud platform where data analytics tasks can be conducted. The developers may also access and configure its IoT analytics account in the cloud through laptop.

FIG. 9 shows the user dashboard of Intel IoT analytics, in which a user may conduct different analytics related tasks, for instance, monitoring the data sent from the sensors (or other edge devices), configuring or controlling the edge devices.

Other companies such as Cumulocity, Xively, Keen.io, etc. provide services or products similar to the Intel IoT platform. It is worth noting that most of those services and products are all based on proprietary solutions in the sense that each of those companies has their own Developer Kits, API specifications and documentations, etc.

Apache Hadoop is an open source framework for distributed storage and processing of large sets of data on commodity hardware. Hadoop enables businesses to quickly gain insight from massive amounts of structured and unstructured data.

Numerous Apache Software Foundation projects make up the services required by an enterprise to deploy, integrate and work with Hadoop. Each project has been developed to deliver an explicit function and each has its own community of developers and individual release cycles. FIG. 10 shows the overview of Apache Hadoop ecosystem.

As mentioned earlier, Hadoop ecosystem is the de-facto large-scale data processing infrastructure for big data related applications and many companies build their various data analytics related services or products on top of the Hadoop framework. For example, a company can provide weather prediction services to its users, where the services are exposed to the users through a simple RESTful interface. Users may just send Hypertext Transfer Protocol (HTTP) requests to the service portal to obtain weather predictions, without knowing any details about how this prediction is done (in these cases, the company may utilize Hadoop infrastructure on the back-end for processing massive data in order to make weather predictions).

A typical Machine-to-Machine (M2M) system architecture is shown in FIG. 11, in which an M2M area network 1102 provides connectivity between M2M end devices and M2M gateways (GWs) 1104. Examples of M2M area networks include personal area network based on technologies such as IEEE 802.15, Zigbee, Bluetooth, etc. The M2M end devices communicate with the M2M GW, and eventually with the M2M Server 1106, allowing interaction and/or interfacing with external networks and application systems. A large percentage of M2M devices are resource-constrained entities that provide services such as reporting sensory information (e.g. humidity, temperature, etc.) or function as controllers (e.g. a light switch). However there are also a number of resource-rich entities e.g., home appliances with power supply, cellphones, vehicles, as well as other industry equipment.

From a protocol stack perspective, a service layer 1202 is typically situated above the application protocol layer 1206 and provides value added services (e.g. device management, data management, etc.) to applications 1204 (see FIG. 12 for illustration) or to another service layer. Hence a service layer is often categorized as 'middleware' services.

An example deployment of an M2M/IoT service layer, instantiated within a network, is shown in FIG. 13. In this example, a service layer instance is a realization of the service layer. A number of service layer instances are deployed on various network nodes (i.e. gateways and servers) for providing value-added services to network applications, device applications as well as to the network nodes themselves. Recently, several industry standard bodies (e.g., oneM2M oneM2M-TS-0001, oneM2M Functional Architecture-V-2.3.0) have been developing M2M/IoT service layers to address the challenges associated with the integration of M2M/IoT types of devices and applications into the deployments such as the Internet, cellular, enterprise, and home networks.

An M2M service layer can provide applications and devices access to a collection of M2M-oriented service capabilities. A few examples of such capabilities include security, charging, data management, device management, discovery, provisioning, and connectivity management. These capabilities are made available to applications via Application Program Interfaces (APIs) which make use of message primitives defined by the M2M service layer.

The goal of oneM2M is to develop technical specifications which address the need for a common service layer that can be readily embedded within hardware apparatus and software modules in order to support a wide variety of devices in the field. The oneM2M common service layer supports a set of Common Service Functions (CSFs) (i.e. service capabilities), as shown in FIG. 14. An instantiation of a set of one or more particular types of CSFs is referred to as a Common Services Entity (CSE) 1402 which can be hosted on different types of network nodes (e.g. Infrastructure Node (IN) and Middle Node (MN), and Application-Specific Node (ASN)). Such CSEs are termed IN-CSE, MN-CSE and ASN-CSE respectively as defined in oneM2M-TS-0001, oneM2M Functional Architecture-V-2.3.0. The CSEs 1402 provide the service capabilities to other CSEs as well as to Application Entities (AEs) 1404. Typically, AE 1404 represents an instantiation of application logic for end-to-end M2M solutions and examples of the AE 1404 can be an instance of a fleet tracking application, a remote blood sugar monitoring application, a power metering application, or a controlling application, etc.

Initially, oneM2M service layer was developed to be compliant to the Resource-Oriented Architecture (ROA) (oneM2M-TS-0001, oneM2M Functional Architecture-V-2.3.0) design principles, in the sense that different resources are defined within the oneM2M ROA RESTful architecture (as shown in FIG. 15). A resource is a uniquely addressable element in the architecture and can be manipulated via RESTful methods such as Create, Retrieve, Update, and Delete. These resources are addressable using Uniform Resource Identifiers (URIs). A resource may contain child resource(s) and attribute(s).

Recently, oneM2M has started developing an M2M Service Component Architecture (as shown in FIG. 16), to consider deployments that are not RESTful based. This architecture is primarily suitable for the infrastructure domain where the CSE 1402 is viewed as a set of service components. It largely re-uses the existing service layer architecture shown in FIG. 15 but within the service layer it organizes various M2M services and multiple services into service components. In addition to existing reference points, the service-oriented architecture (SOA) architecture introduces the inter-service reference point Msc. Communication between M2M Service Components (passing over the Msc reference point) utilizes a web service approach, which is the most popular technology for building SOA-based software systems.

SUMMARY

A common Data Analytics Service (DAS) at service layer is designed to use underlying existing/future data analytics technologies or tools and provide them to service layer entities that need those data analytics operations with uniform access approach. A general operation framework/interface design can enable DAS and the operation details within DAS. Related procedures for interacting with DAS can include new parameters in service layer request/response messages.

A general operation framework for enabling DAS defines how DAS works at service layer. The operation details and functionality design inside DAS allows different types of data analytics capabilities (such as basic data statistics, information extraction, image processing, etc.) to be added into DAS and exposed to the clients of DAS (i.e., AEs or CSEs) through uniform interfaces exposed by DAS.

In particular, for a given type of underlying data analytics operation added or plugged into DAS, a Service Type Profile (STP) is defined to specify the detailed information of its corresponding uniform interface and access information.

A number of procedures for interacting with DAS are described. These procedures are typically applicable to four different cases/scenarios:

Case 1: The client of DAS first obtains its targeted/interested raw data to be analyzed, and then sends it to DAS for analysis.

Case 2: The client will directly ask DAS for certain data analytics operations, and DAS, on behalf of the client, retrieves the targeted/interested raw data to be analyzed.

Case 3: Considering the large/massive data volume in the context of big data scenario in this case, instead of moving data to a certain DAS for processing, the data analytics processing is moved to a DAS closer to the targeted data.

Case 4: A subscription-based paradigm for interacting with DAS is defined in order to consider the typical characteristics of M2M/IoT systems.

The new service DAS can be embodied as a new CSF at Service Layer for providing a common data analytics service. A new oneM2M resource has also been defined for representing the STP.

A User Interface is also described for supporting real-time monitoring and configuration in DAS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIGS. 24A-B is a flow chart that illustrates a forth procedure for interacting with a DAS service.

FIG. 28A-B are diagrams that illustrate a GUI Interface for Monitoring a DAS service.

DETAILED DESCRIPTION OF ILLUSTRATIVE EMBODIMENTS

There are already different types of data analytics services available on the market. In particular, since data analytics is a broad concept, in the sense that it may refer to different forms/types of analytical tasks/operations, these existing data analytics services may provide different functionalities. In addition, some of these analytics services are specifically designed for facilitating manual operation for human users, while others are focused on automatic analytic processing in the context of e.g., M2M/IoT systems.

The existing oneM2M service layer does not have a capability for enabling a "common data analytics service". In particular, the following discusses the potential issues and shortcomings when such a common data analytics service is missing from the service layer and the needs for such a service.

Today, most endpoints (AEs/CSEs) cannot extract intrinsic information from data accessible in the service layer (especially for the unstructured data such as images, documents/logs, etc.), which poses a need for a common data analytics service at service layer.

On the one hand, as introduced above, various types of data, such as semi-structured and unstructured data (such as audio, video, webpage, and text) or structured data (such as those stored in database tables), can co-exist in a system. This is especially true in the context of M2M/IoT systems (which is a major trend driving the growth in big data). It is predicted that more than 70% of data generated from M2M/IoT systems will be unstructured data, such as images captured by outdoor monitoring cameras.

Figure 1:
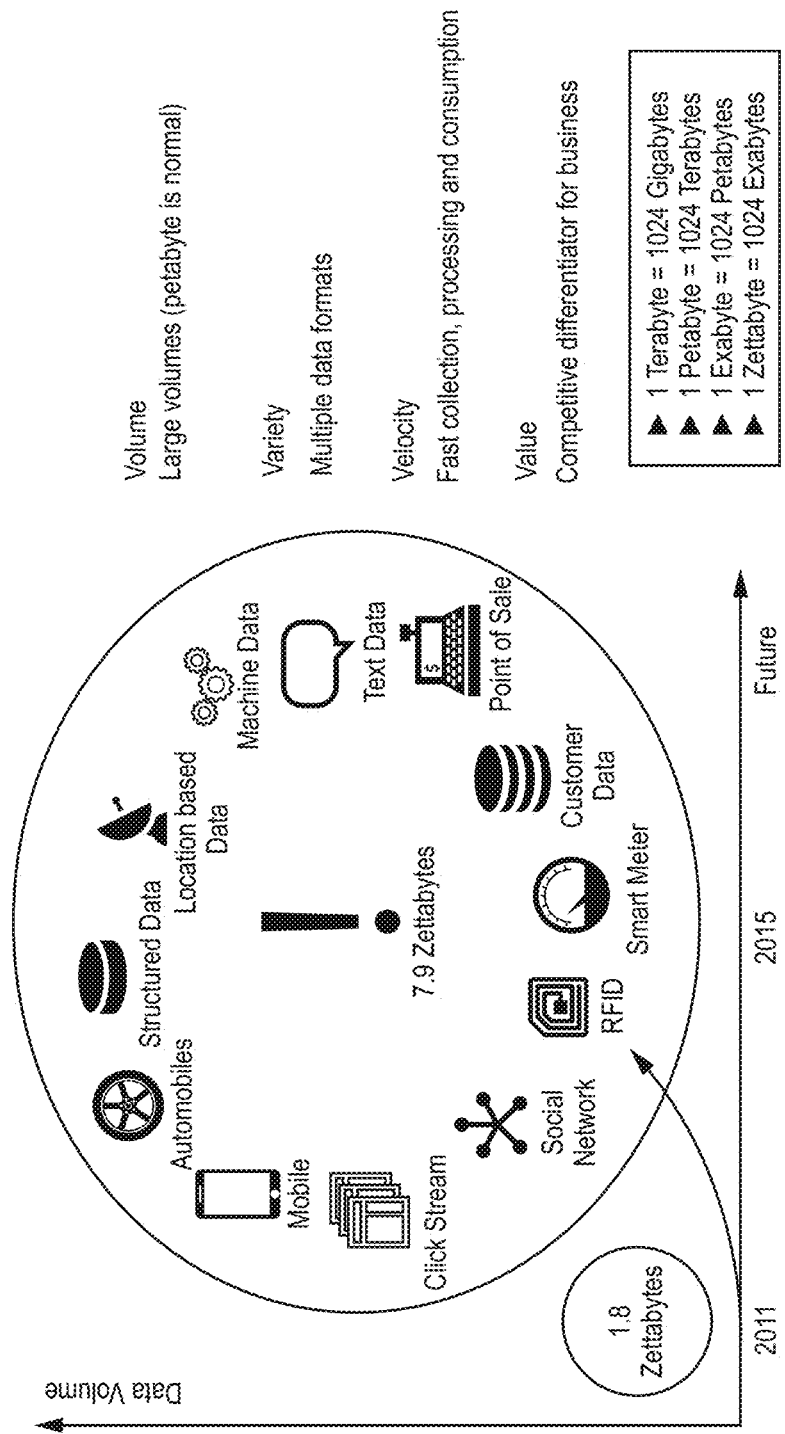
FIG. 1 is a diagram that illustrates a definition of big data.
Figure 2:
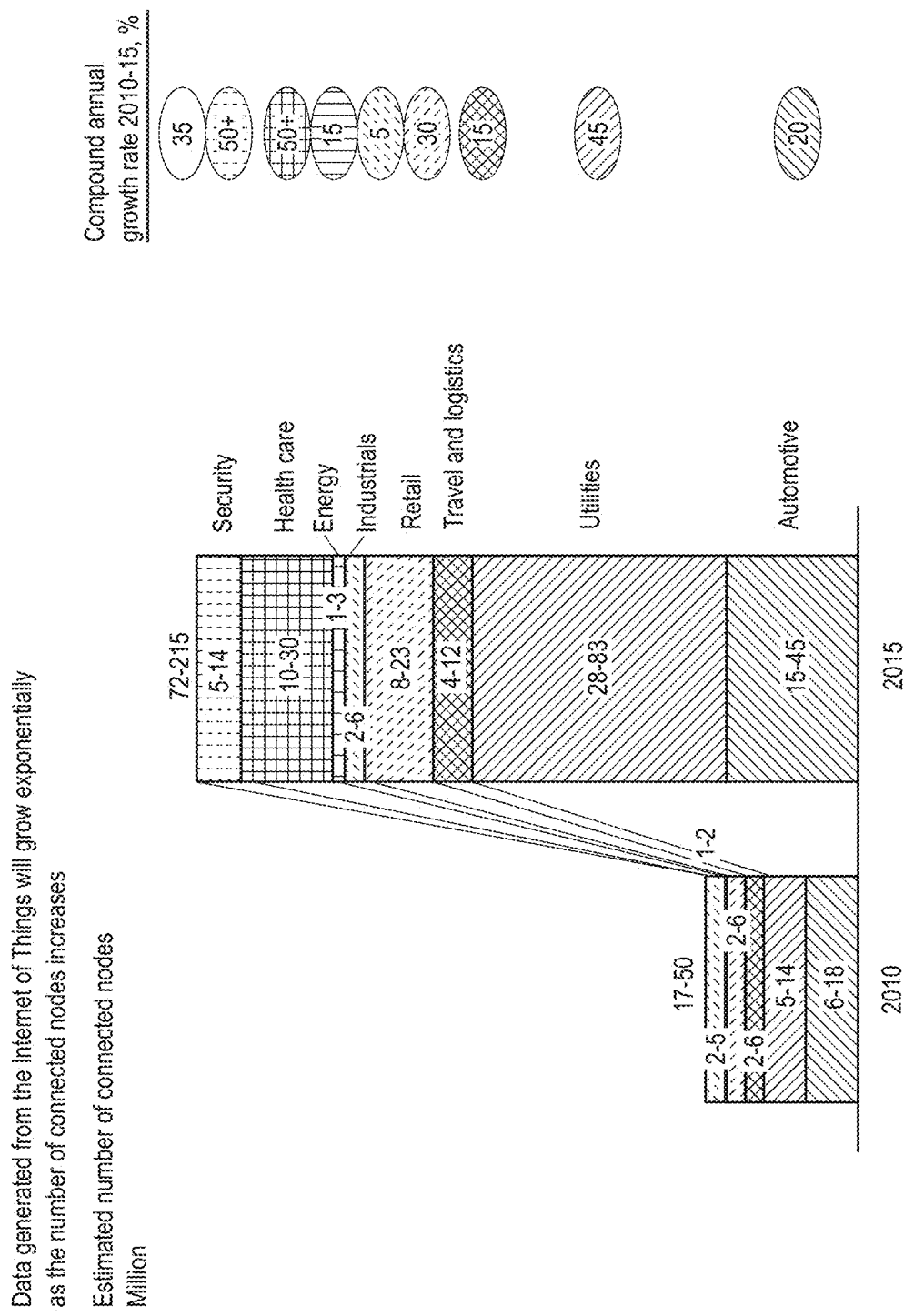
FIG. 2 is a diagram that illustrates Internet of Things (IoT) growth.
Figure 3:
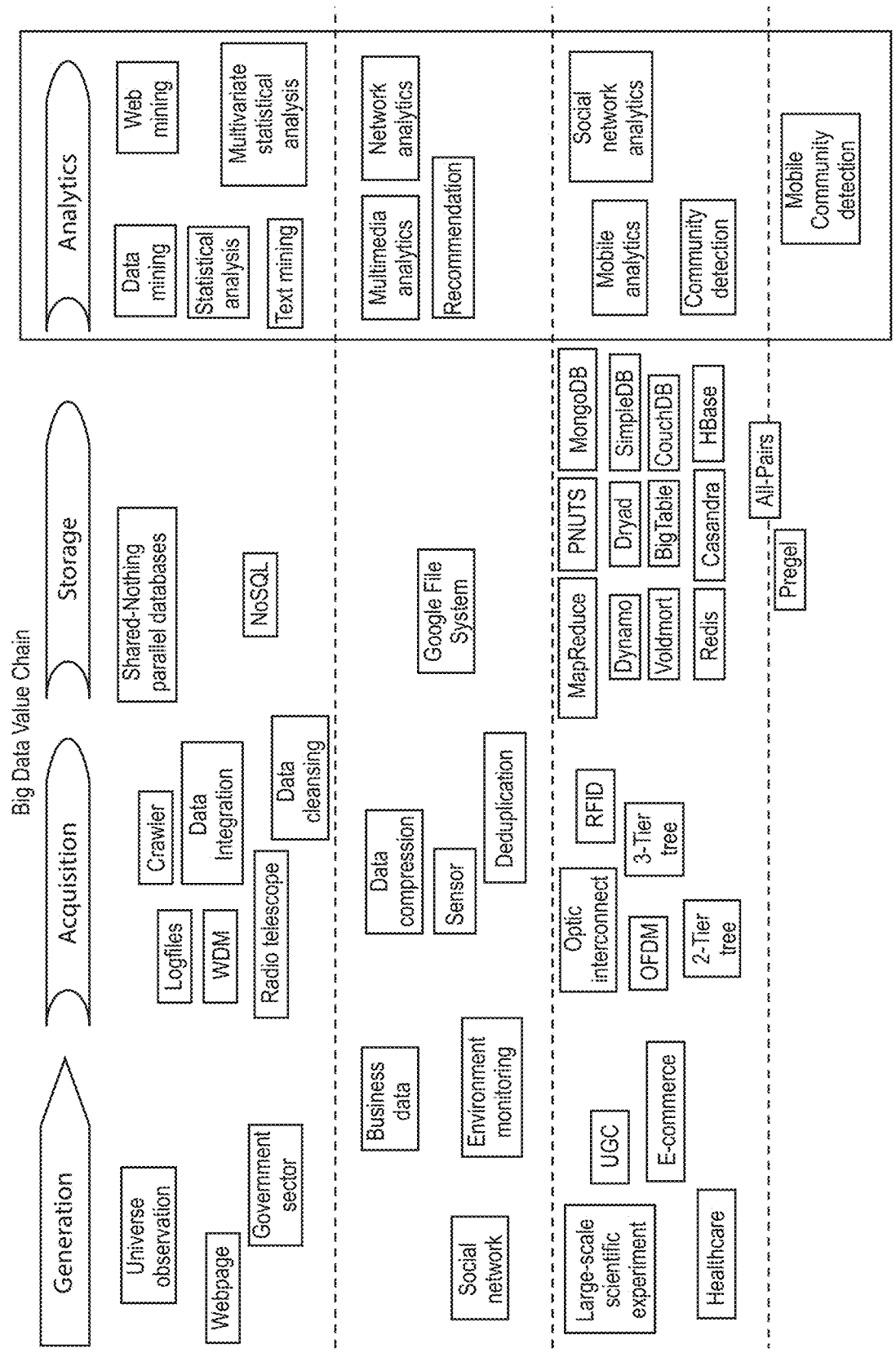
FIG. 3 is a diagram that illustrates a value chain of big data.
Figure 4:
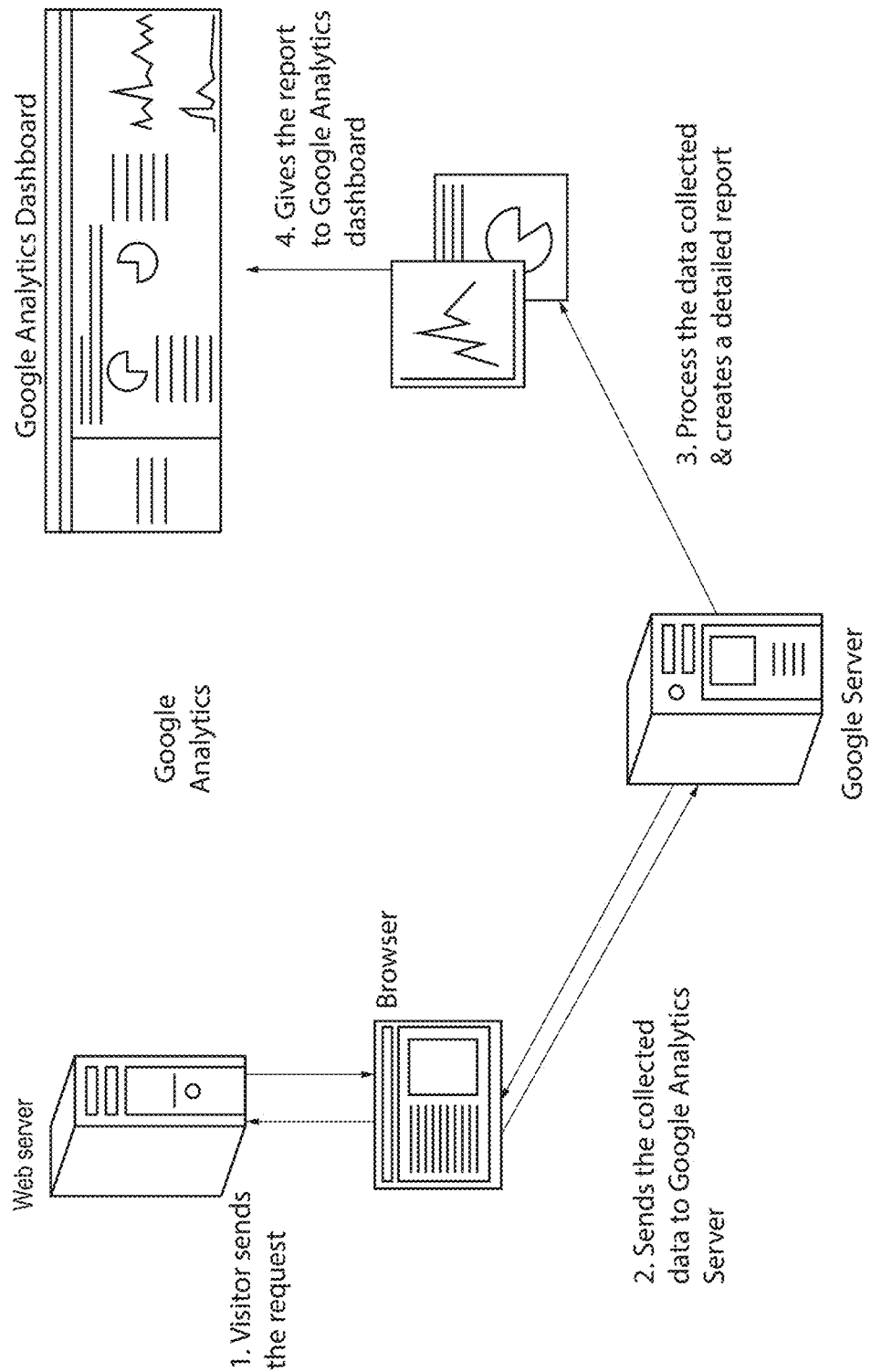
FIG. 4 is a diagram that illustrates a general architecture of Google analytics.
Figure 5:
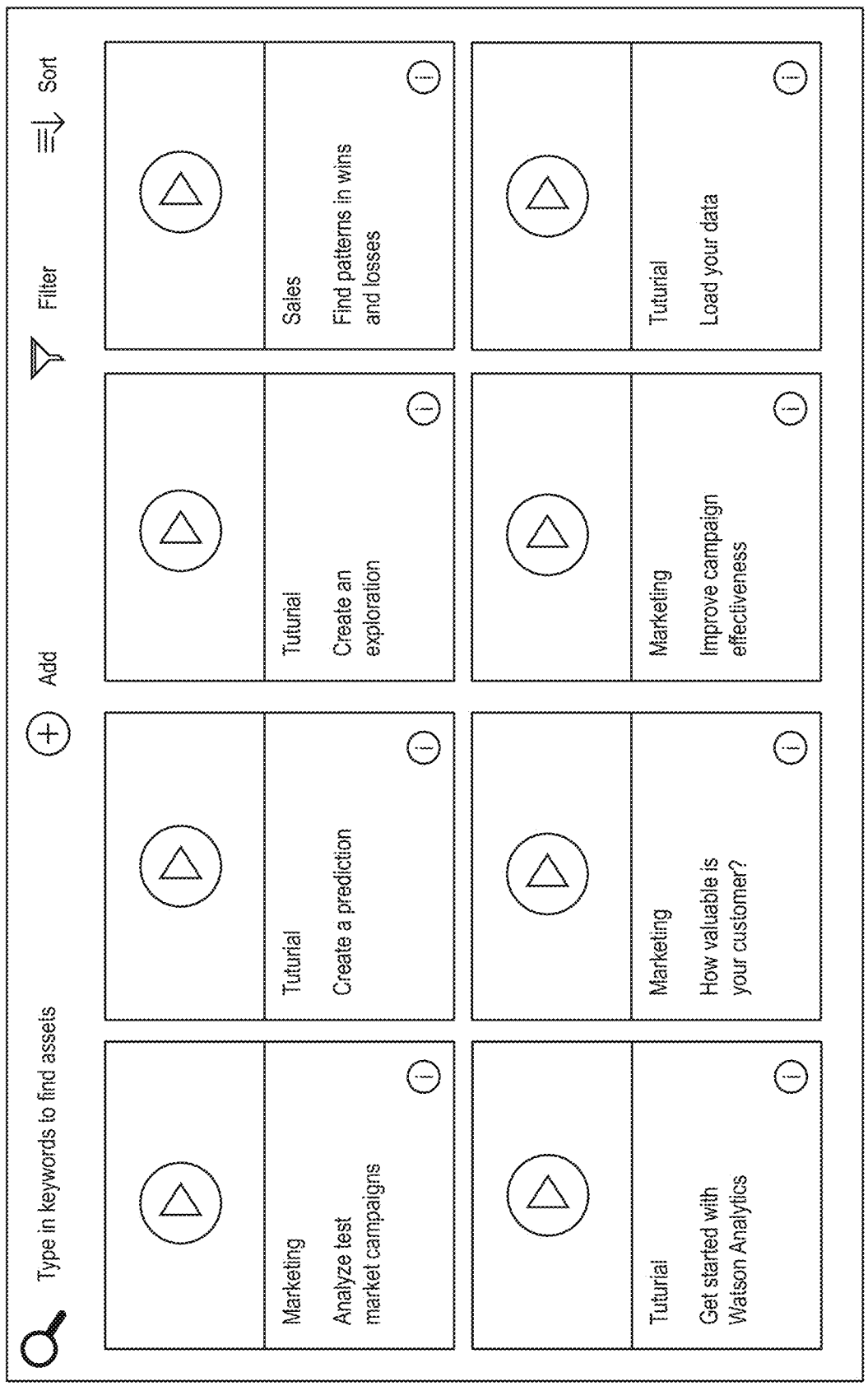
FIG. 5 is a diagram that illustrates a snapshot of IBM Watson Analytics.
Figure 6:
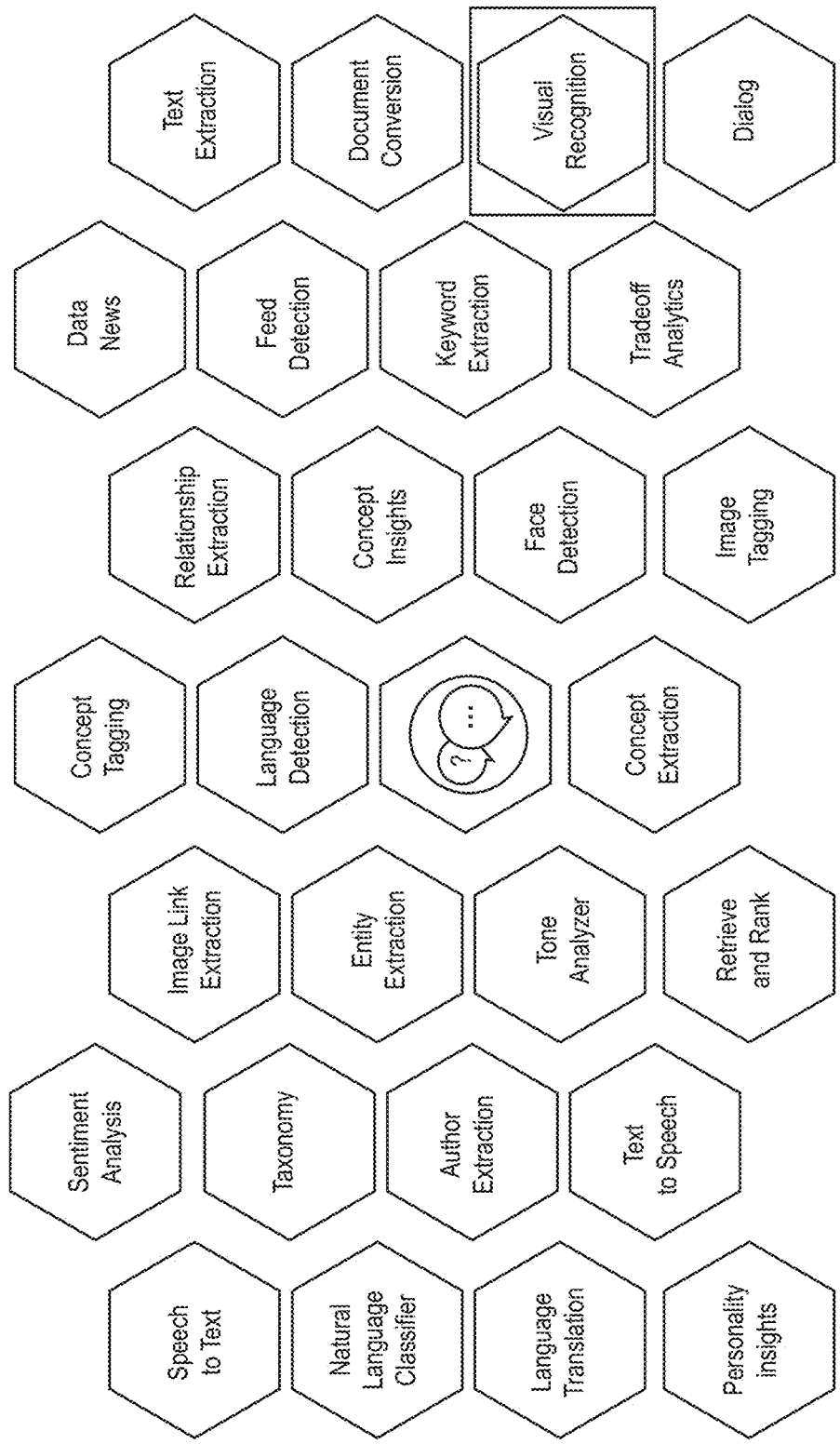
FIG. 6 is a diagram that illustrates RESTful Analytics Services Provided by IBM Watson Developer Cloud.
Figure 7:
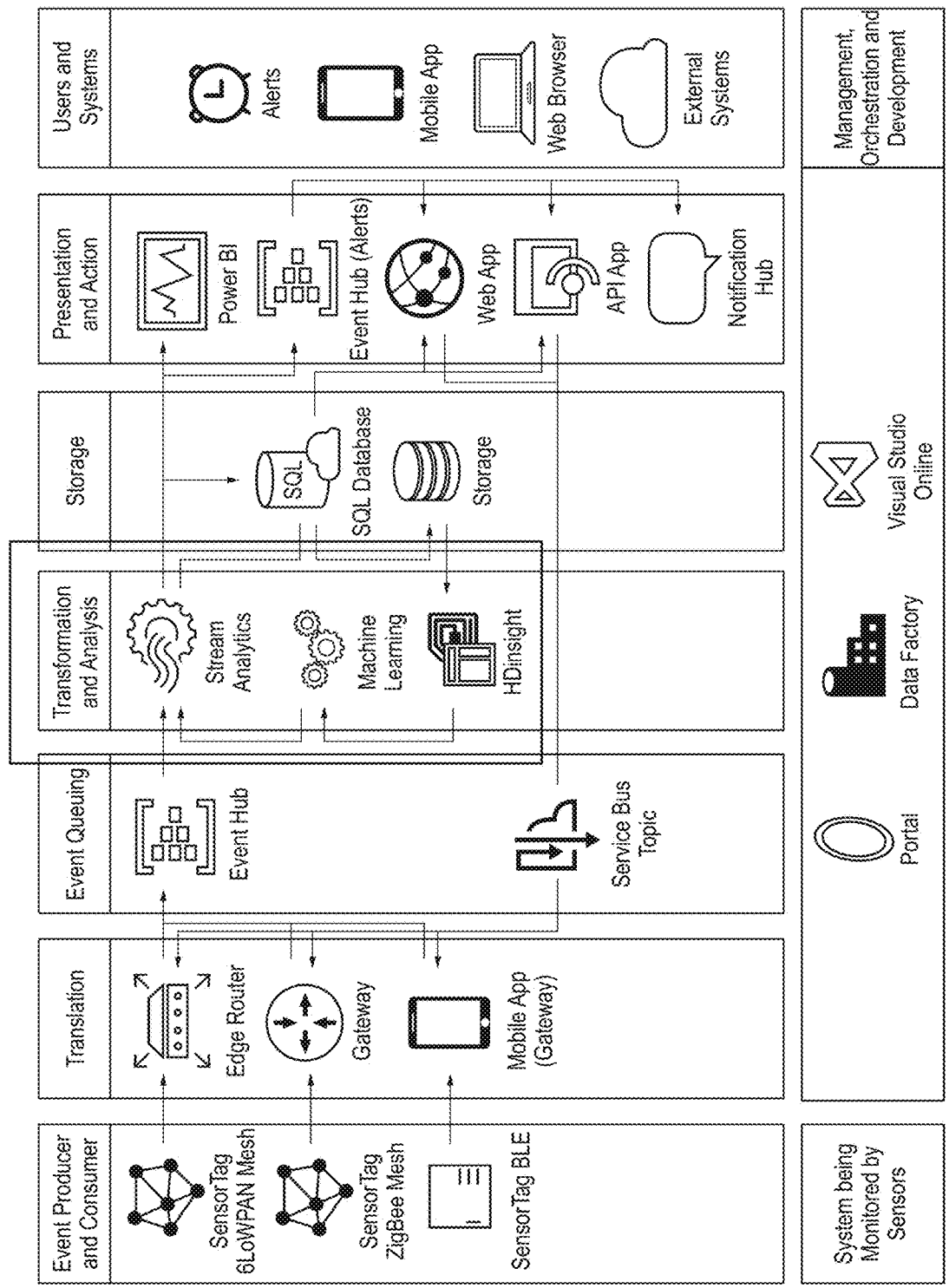
FIG. 7 is a diagram that illustrates an architecture of data analytics-related services used by Microsoft Azure.
Figure 8:
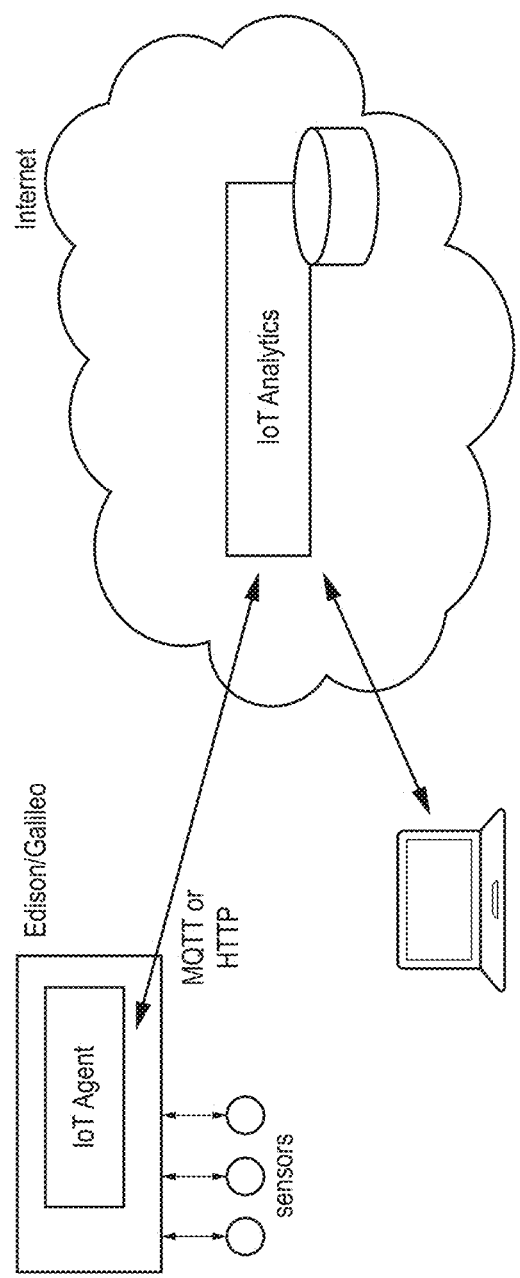
FIG. 8 is a diagram that illustrates a general architecture of Intel IoT analytics service.
Figure 9:
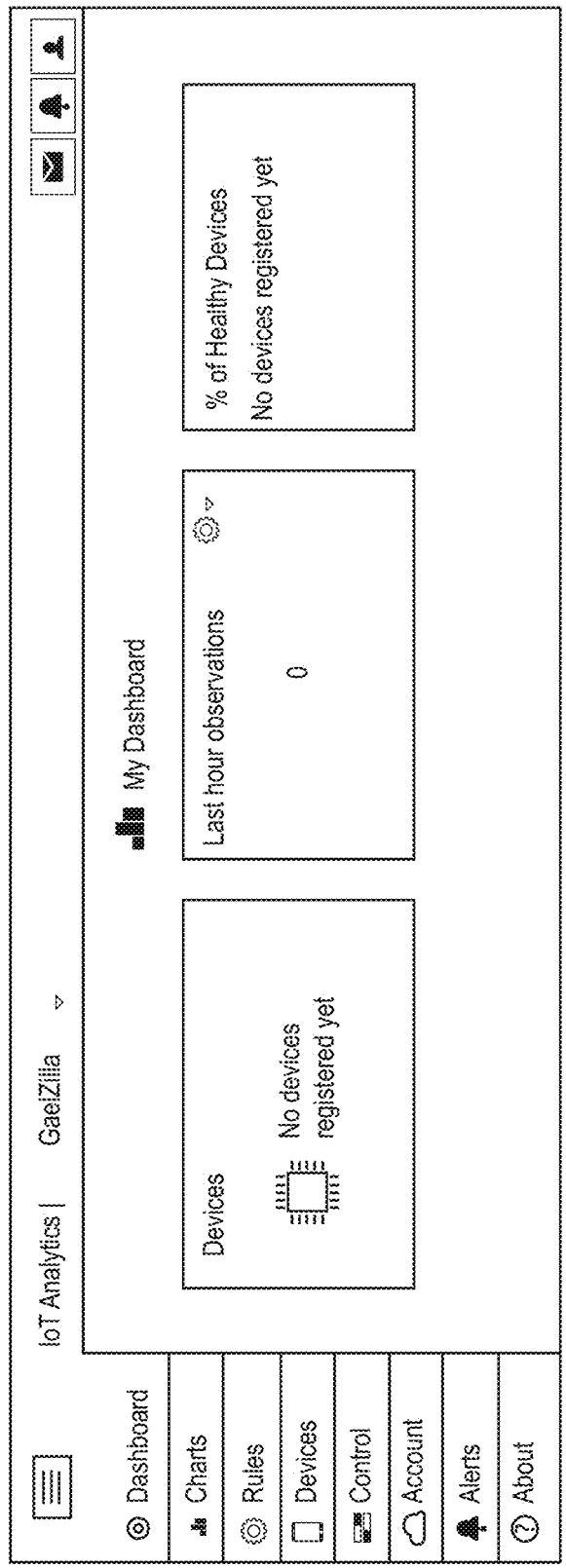
FIG. 9 is a diagram that illustrates a user dashboard of Intel IoT analytics service.
Figure 10:
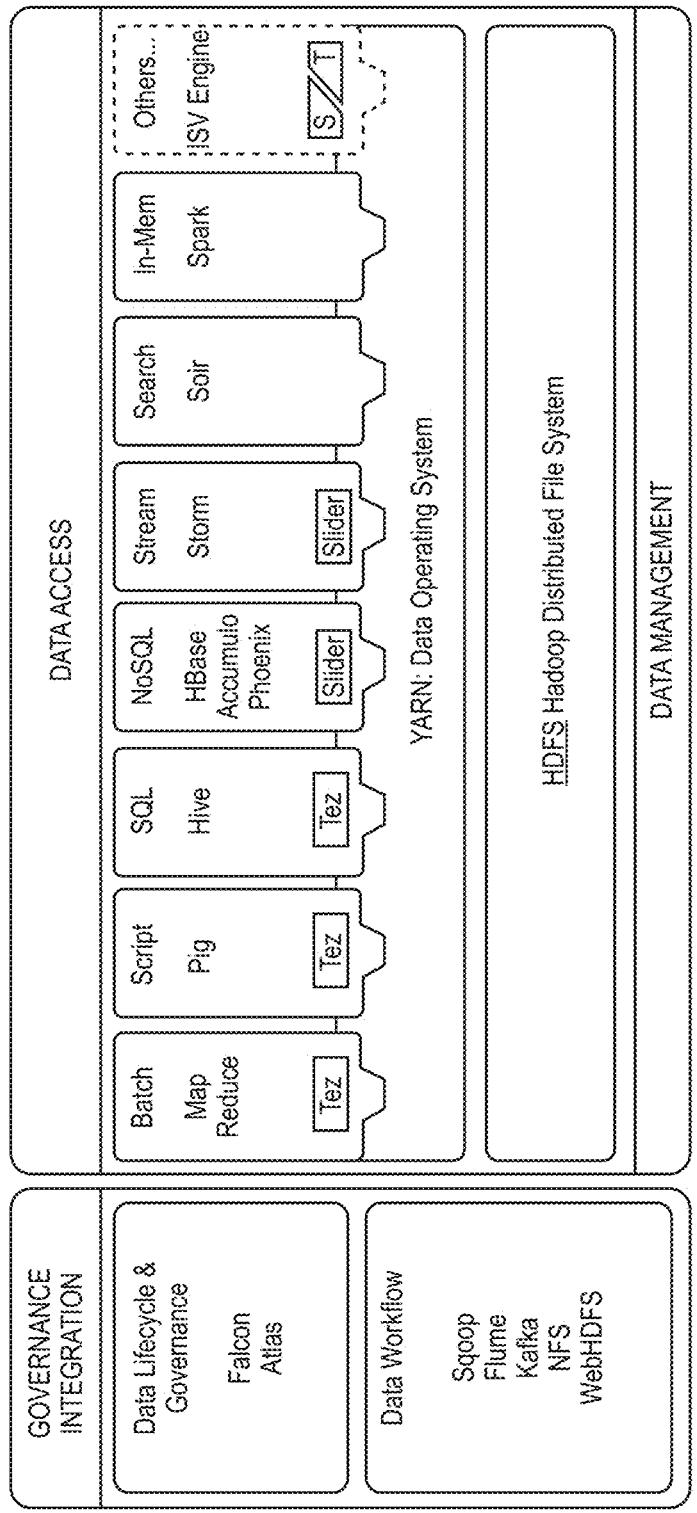
FIG. 10 is a diagram that illustrates an overview of Apache Hadoop Ecosystem.
Figure 11:
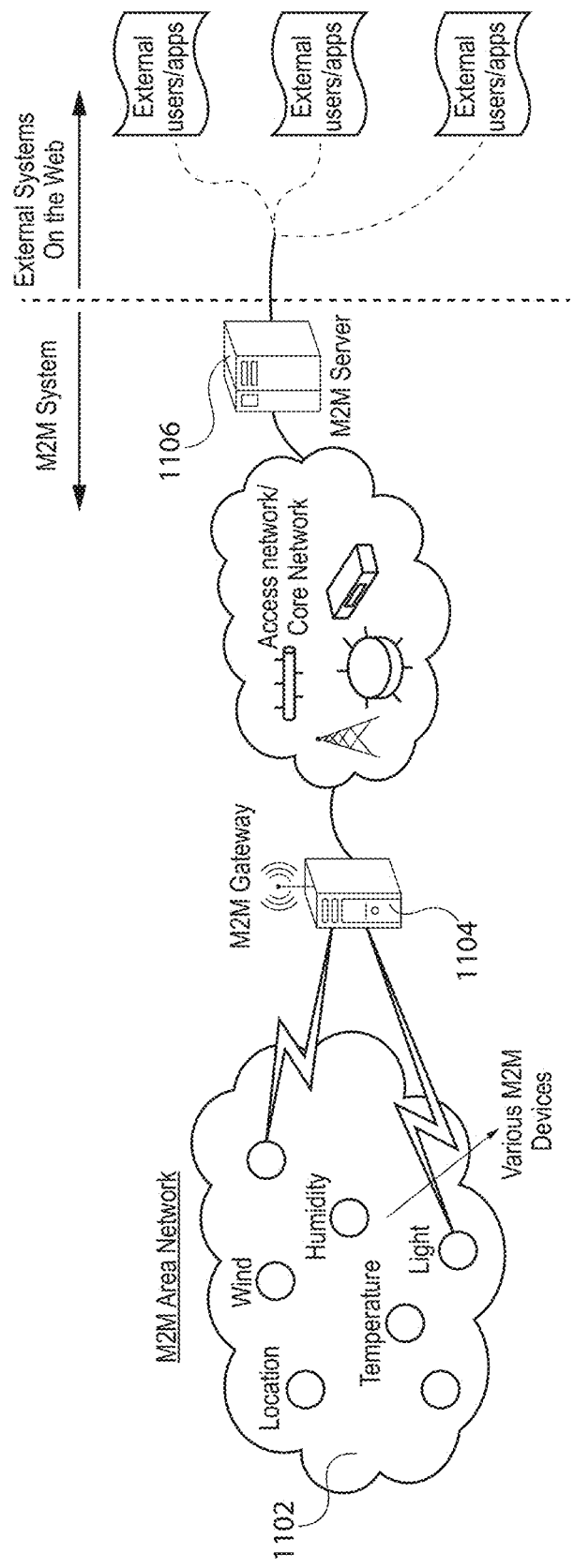
FIG. 11 is a diagram that illustrates an M2M system/network architecture and services.
Figure 12:
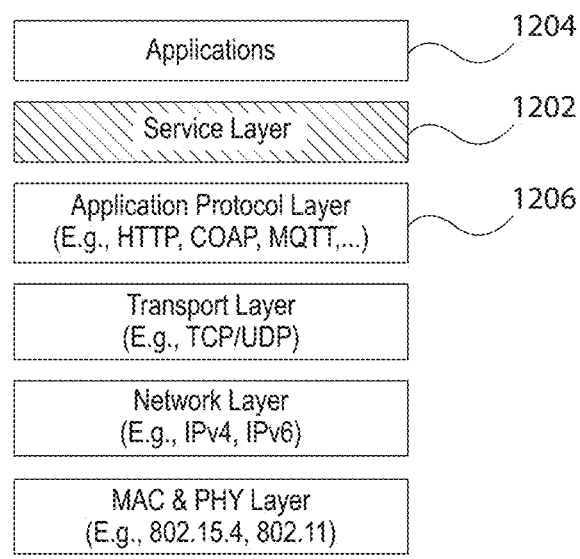
FIG. 12 is a diagram that illustrates an exemplary protocol stack supporting a service layer.
Figure 13:
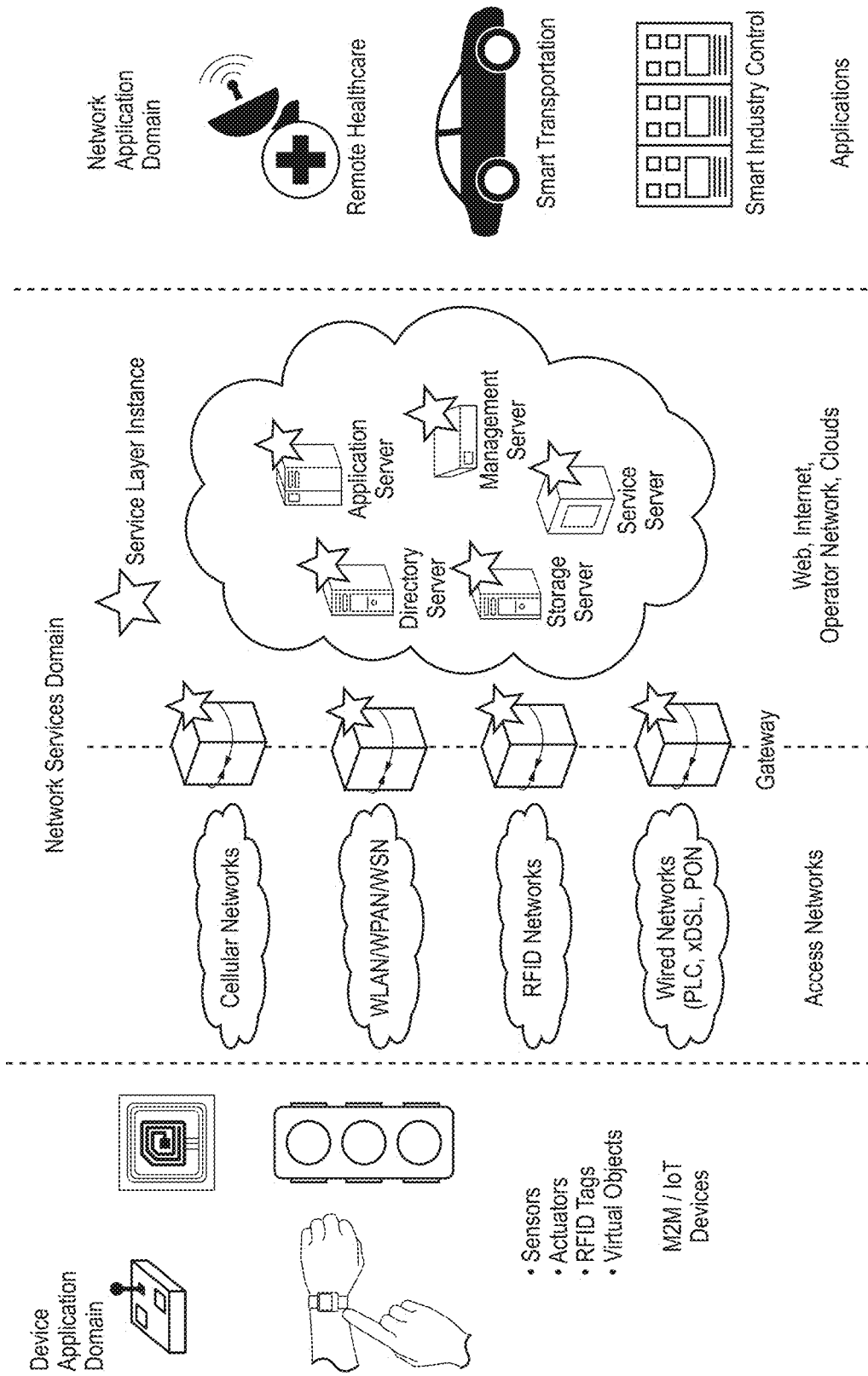
FIG. 13 is a diagram that illustrates an example illustrating M2M/IoT service layer deployment within a network.
Figure 14:
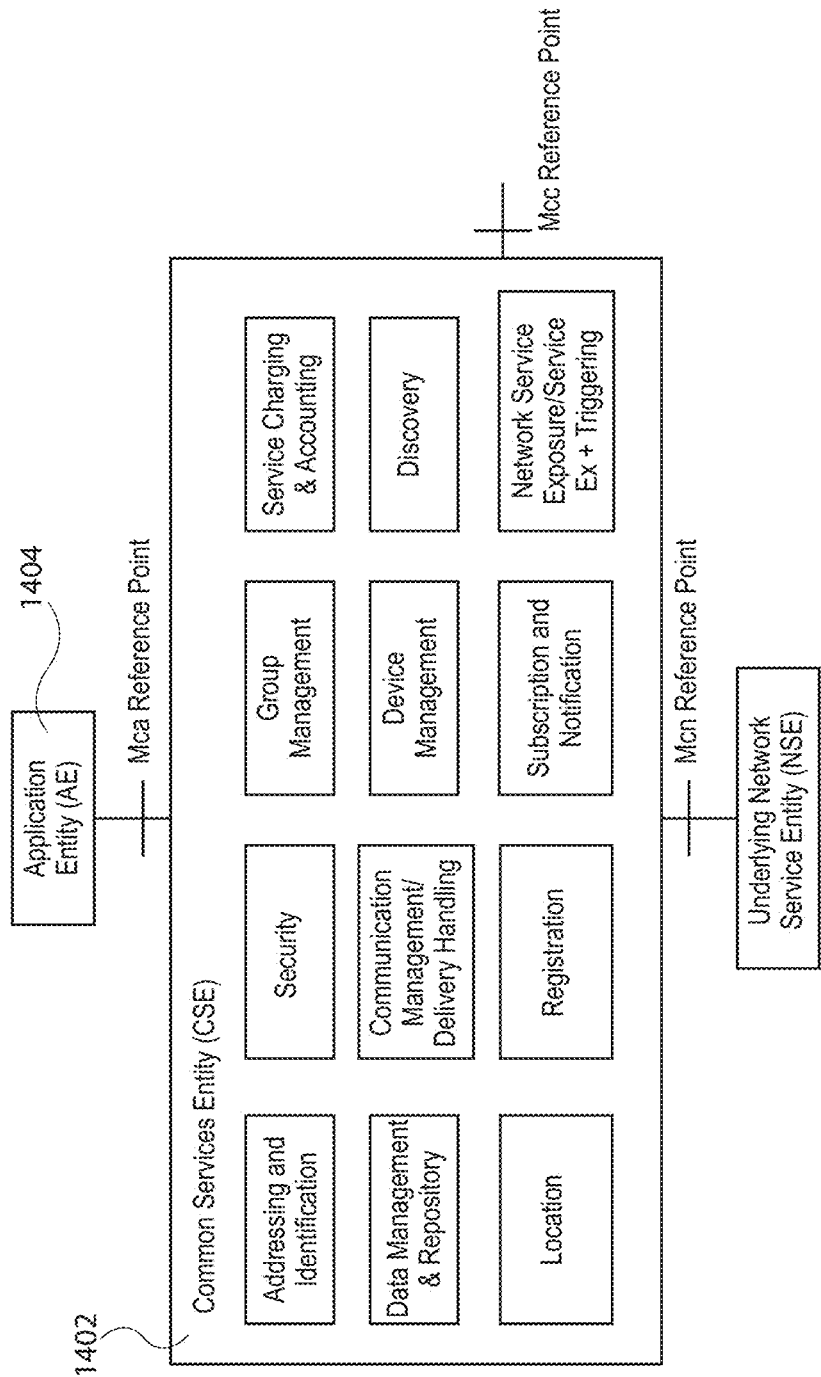
FIG. 14 is a diagram that illustrates Common Services Functions (CSFs) in a oneM2M service layer.
Figure 15:
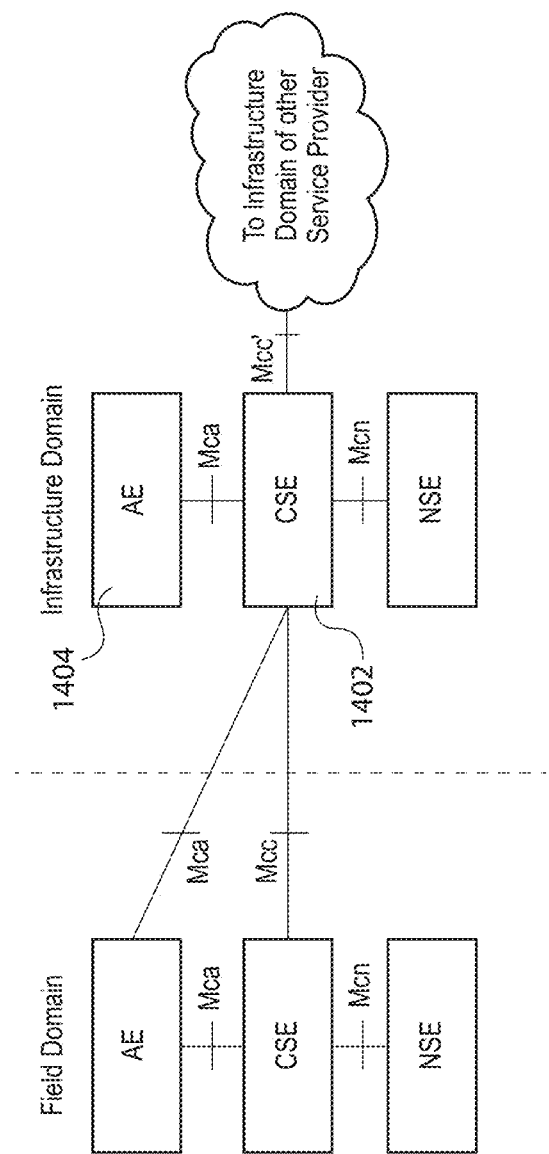
FIG. 15 is a diagram that illustrates a oneM2M service layer resource-oriented architecture.
Figure 16:
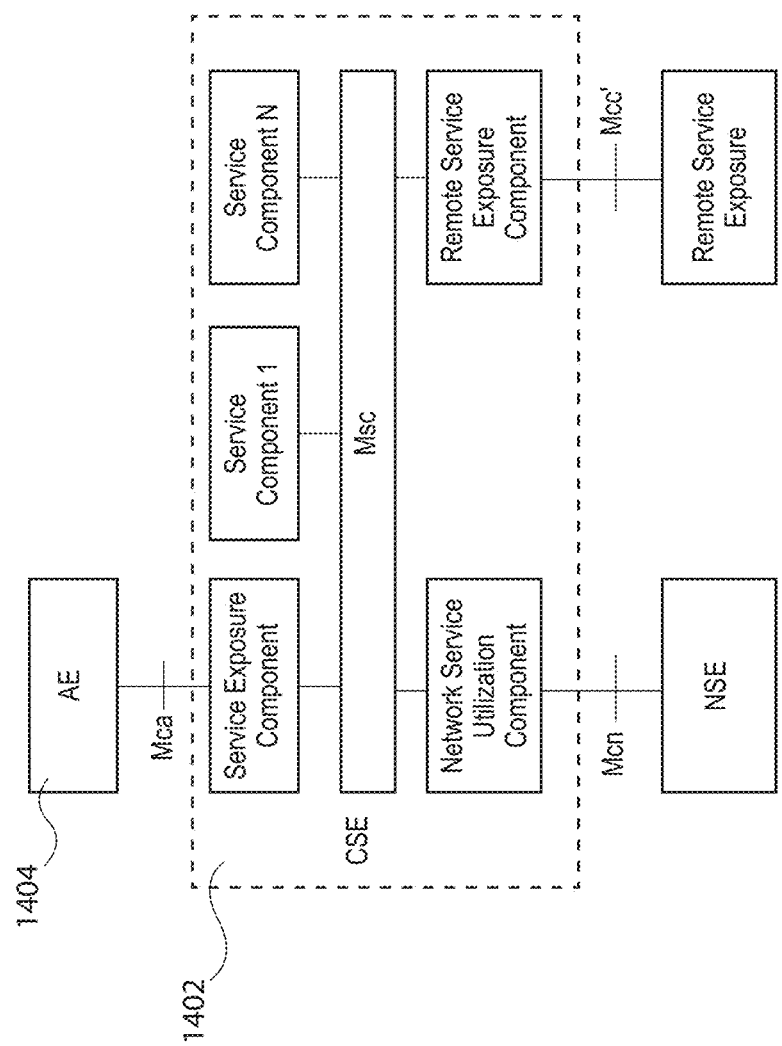
FIG. 16 is a diagram that illustrates a oneM2M services component architecture.
Figure 17:
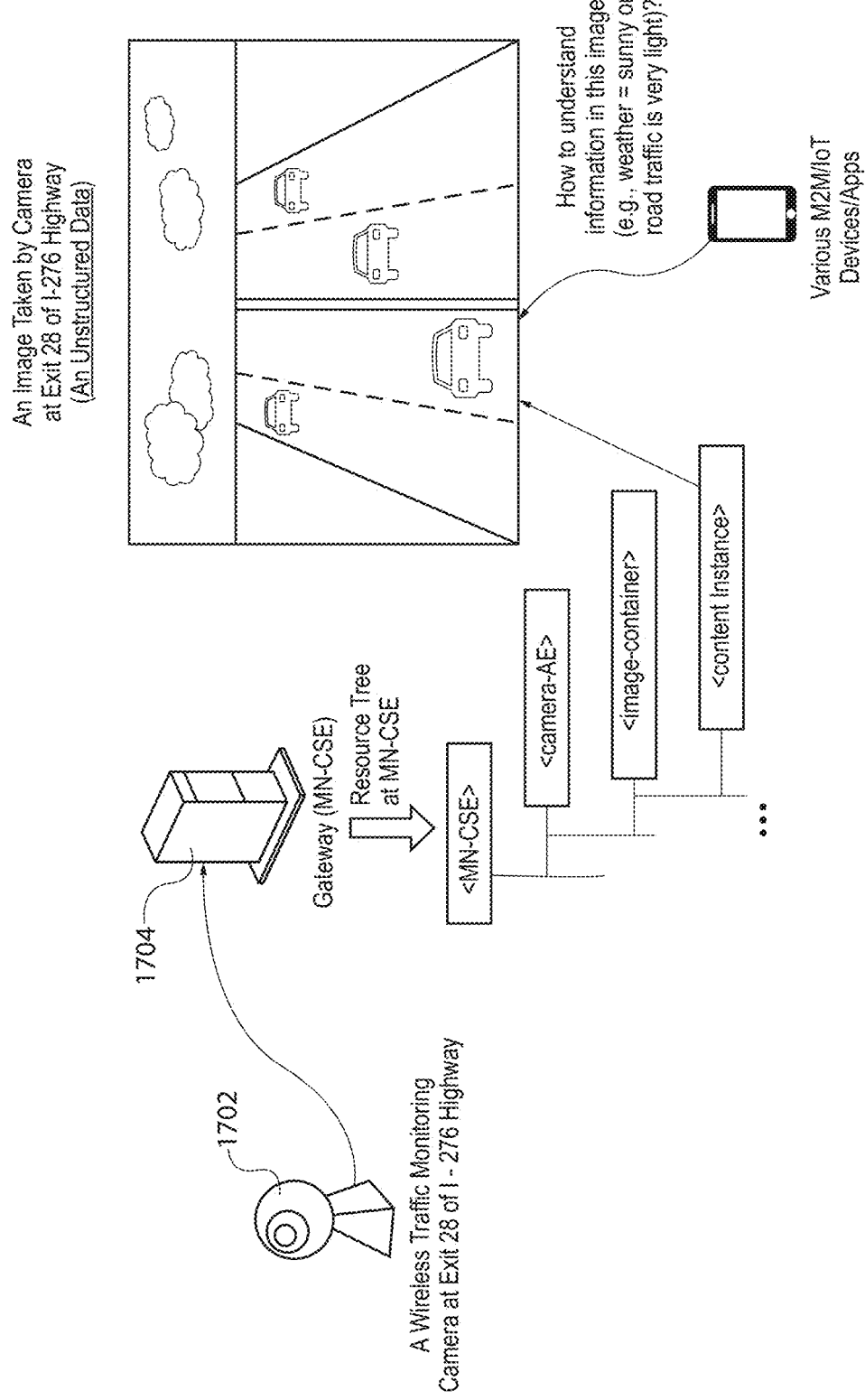
FIG. 17 is a diagram that illustrates a use case illustrating a highway image (unstructured data) stored in a service layer.

On the other hand, M2M/IoT systems are normally constituted of different types of endpoints, such as apps/devices/desktops inside the M2M systems or from Internet, etc. Therefore, different endpoints may not have the same capability to understand a piece of data generated by an IoT device. For example, some endpoints cannot have data analytics capability/engine especially for the resource-constrained nodes. FIG. 17 shows a use case illustrating this issue.

As shown in FIG. 17, a wireless traffic monitoring camera 1702 at Exit 28 of I-276 highway (with speed limit of 65 mph) is capturing an image and storing it in a <contentInstance> resource at the MN-CSE (Gateway) 1704. Since such an image is a piece of unstructured data, the smartphone (or any other endpoint or service entity e.g., AE/CSE), may be able to access this <contentInstance> resource, but it has no way of really understanding the information in this image, e.g., the current weather is sunny or the current road traffic is very light (the travelling speed could be over 50 mile per hour), etc. It is worth noting that without certain data analytics processing (for instance, the image processing in this case) over this image, such intrinsic information cannot be derived directly. Unfortunately, most of the M2M/IoT endpoints or the service layer entities are not equipped with such data analytics capability by themselves. Furthermore, there is no such common data analytics service defined at the service layer. As a result, from service layer perspective, it can be seen that a lot of potential value is buried in the raw data stored in the service layer and cannot be utilized in an efficient way to serve service layer entities.

In addition, instead of expecting AEs to have their own data analytics capabilities, it is desirable for service layer to enable a "common" data analytics service, which not only simplifies the function design requirements on various endpoints and AEs, but also beneficial for resource or capability sharing.

Even if the service layers can plug-in external data analytics capabilities, there is no uniform interface to allow endpoints (AEs and CSEs) to access various data analytics services unless they follow the respective proprietary API specifications.

Although there are different types of data analytics services available on the market, most of those services and solutions are proprietary solutions in the sense that each of those solutions have their own Developer Kits, API specifications and documentations, etc. However, in general the service layer endpoints (AEs/CSEs) will not know the proprietary interface to access the 3rd party data analytics services. Since the horizontal service layer (such as oneM2M) aims to provide common service functions (CSFs), it is necessary to expose a uniform operation interface to service layer entities by providing a common data analytics service. In other words, no matter how service layer is enabled with different types of data analytics capabilities (either to leverage the existing external data analytics services as underlying technologies or to plug-in certain data analytics modules in a CSE), all those internal details need to be encapsulated or hidden from service layer entities (e.g., AEs/CSEs). For example, it could add more flexibility to adopt any third party data analytics services without worrying about the intricacies of each of these services. (This is the similar methodology of how service layer leverages the existing/underlying Device Management technologies).

In addition, there is no available procedure design regarding to how to enable (configure, use, control, etc.) data analytic service in the context of M2M/IoT systems.

Mechanisms from both data analytics and data communications can enable data analytics capability in M2M/IoT systems. For example, assuming the service layer is already enabled with a common data analytics service, there are still issues regarding how to interact with this service in terms of procedure design (e.g. how to access, configure and control this service, etc.). This is because M2M/IoT systems rely heavily on efficient communication procedures to realize certain functionalities. However, this is not the major focus of the service providers focusing on data analytics. Therefore, new procedures need to be designed in order to efficiently support the interactions between the common data analytics service and the users/clients of this service.

As mentioned previously, the service layer needs data analytics capabilities due to the intrinsic characteristics of big data in M2M/IoT systems. Therefore, a data analytics service function is added at service layer in order to meet such need.

Examples are described in the context of oneM2M to illustrate the detailed methods and procedures. However, these ideas are not limited to oneM2M and can be generalized to any service layers having similar functionalities or needs.

Figure 18:
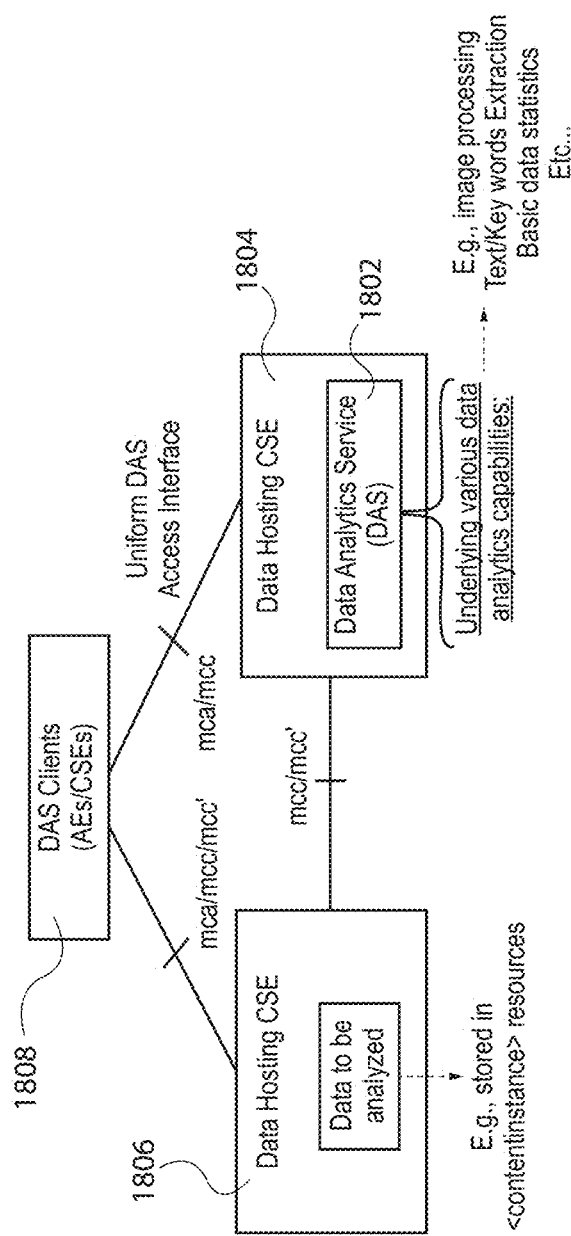
FIG. 18 is a diagram that illustrates a general operation framework of a Data Analytics Service (DAS) service.

FIG. 18 shows a general operation framework of the DAS 1802. In this example, DAS 1802 is provided by a CSE 1804 as a common service function and it can conduct certain data analytics operations on the targeted/interested (raw) data per the request from various entities (e.g., AEs or other CSEs). Since DAS 1802 is a common service at service layer, it is likely that those raw data to be analyzed are stored in the existing <contentInstance> resources defined by oneM2M, for example. Accordingly, the CSE hosting the data to be analyzed is called "Data Hosting CSE" 1806 and the CSE hosting DAS is defined as "DAS Hosting CSE" 1804. In addition, those entities needing data analytics operations provided by DAS are defined as "DAS Clients" 1808. In a more general sense, it is worth noting that one CSE node can be as both Data Hosting CSE 1806 and DAS Hosting CSE 1804 if the raw data to be analyzed is co-located with DAS 1802. In the meantime, the interactions between those entities can happen in mca/mcc/mcc' reference points as shown in FIG. 18.

In addition, DAS 1802 can be equipped with various analytics capabilities. Data analytics is a broad area, and many types of data processing operations can be categorized as a "data analytics service". For example, in a simplistic case, a basic data statistics service may be used for doing mathematical data aggregation operations on a set of raw data (e.g., sensor readings), such as MAX, MIN, AVERAGE, etc. Another example, image processing operation can be provided by DAS when an AE requires to derive useful information from an image if this AE does not have such a capability. Information extraction technology is used when it is required to extract useful data items from a JSON document, a log record, or a webpage, etc. Therefore, on one hand, those different types of data analytics operations will be the common service that DAS 1802 can leverage the existing various data analytics technologies/tools as plug-ins or export to certain external service portals for providing those data analytics operations. On the other hand, DAS 1802 itself may provide a common data analytics service to its DAS clients 1808 by providing uniform interfaces (as shown in FIG. 18) and hiding the underlying intricacies of DAS 1802 from them. It is worth noting that by providing such a feature, the service layer entities (e.g., AEs/CSEs) will just need to interact with DAS 1802 as a client 1808 of DAS 1802, instead of having to deal with all the underlying details of a proprietary data analytics application.

It is understood that the functionality illustrated in FIG. 18, may be implemented in the form of software (i.e., computer-executable instructions) stored in a memory of, and executing on a processor of, a node or apparatus of an M2M network (e.g., a server, gateway, device, or other computer system), such as one of those illustrated in FIG. 29C or 29D described below.

Figure 19:
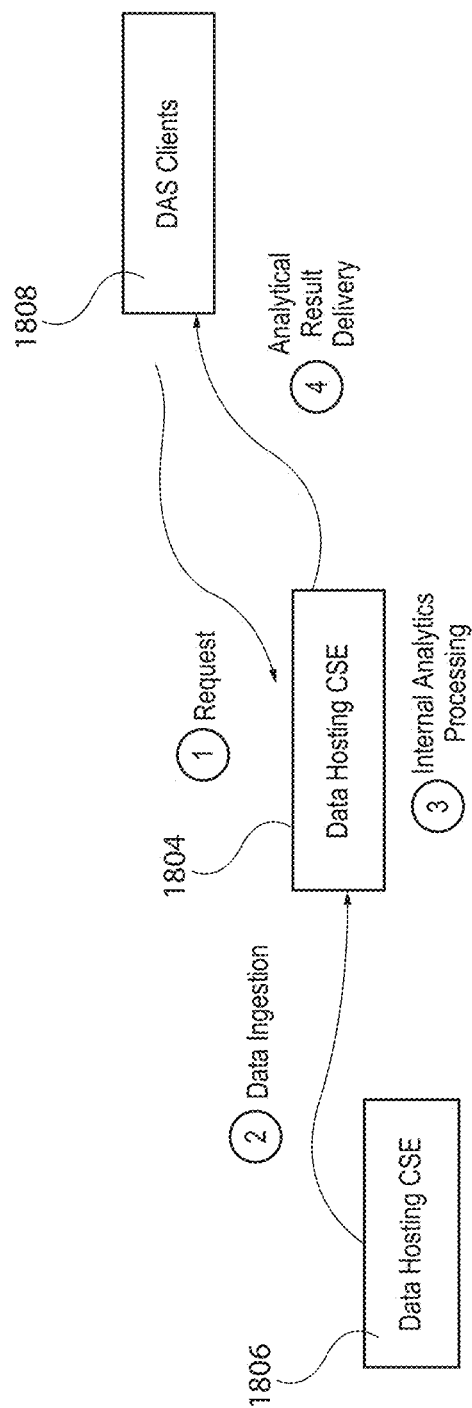
FIG. 19 is a diagram that illustrates a high-level operation flow of a DAS service.

FIG. 19 shows a high-level operation flow between the several entities as defined in FIG. 18. FIG. 19 includes four main stages. Each of those four stages may include one or more service layer request/response messages, and those details will be illustrated later when the related procedures are described.

In FIG. 19, first a DAS client 1808 initializes a request to DAS hosting CSE 1804 for certain data analytics operations on its targeted/interested data (shown by Stage 1 in FIG. 19). Then, a data ingestion process (Stage 2 in FIG. 19) inputs the data to be analyzed into DAS 1802. Typically, the corresponding Data Hosting CSE 1806 will deliver the raw data to the DAS hosting CSE 1804. Alternatively, it is also possible that the DAS client 1808 may first retrieve the raw data by itself and include it in the payload of request sent to DAS hosting CSE 1804. In this case, the Stages 1 and 2 are combined together. During Stage 3, which normally happens inside DAS 1802, DAS 1802 selects appropriate underlying analytics technologies for conducting specific data analytics operations requested by the DAS clients 1808. The working details of those underlying data analytics technologies can be hidden or abstracted from DAS clients 1808. Lastly, once the DAS 1802 works out the analytical results, it can deliver the results to the DAS client 1808 via the uniform interface (Stage 4 in FIG. 19).

Overall, the DAS 1802 adopts the existing underlying technologies and expose a uniform interface to service layer entities. A general architecture design and procedure design to support interaction process between DAS 1802 and its clients 1808 from a M2M/IoT network perspective is described below.

It is understood that the functionality illustrated in FIG. 19, may be implemented in the form of software (i.e., computer-executable instructions) stored in a memory of, and executing on a processor of, a node or apparatus of an M2M network (e.g., a server, gateway, device, or other computer system), such as one of those illustrated in FIG. 29C or 29D described below.

Figure 20:
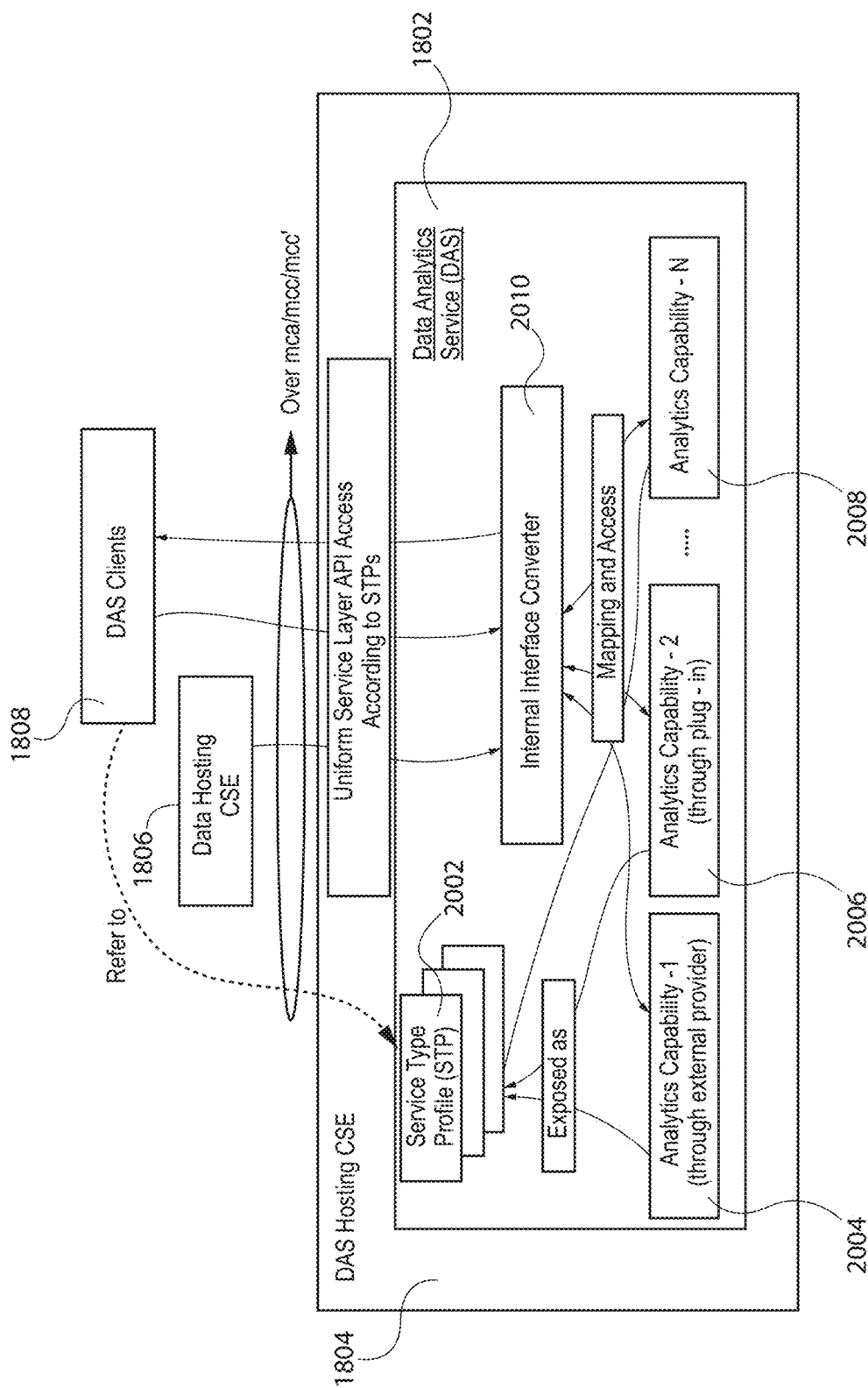
FIG. 20 is a diagram that illustrates operation details and functionality design of a DAS service.

FIG. 20 shows the functionality design inside DAS 1802. It is understood that the functionality illustrated in FIG. 20, may be implemented in the form of software (i.e., computer-executable instructions) stored in a memory of, and executing on a processor of, a node or apparatus of an M2M network (e.g., a server, gateway, device, or other computer system), such as one of those illustrated in FIG. 29C or 29D described below.

As can be seen, different data analytics capabilities can be added into DAS 1802 so that various data analytics operations, such as basic data statistics, image processing, information extraction, etc., can be conducted.

Various approaches for adding those underlying data analytics capabilities into DAS 1802 can be used. If there are already external analytics service portals which can provide data analytic services, the portal access information can be registered or added in DAS 1802. Accordingly, once DAS 1802 receives an analytics request from its client 1808, it can use these external service portals in order to obtain the analytical results.

Alternately, if there are available plug-in analytics modules, such modules can be directly plugged into DAS 1802, so that data analytics operations can be directly executed locally by the corresponding CSE 1804 that is running DAS 1802 (especially for those low-cost lightweight data statistics operation).

Accordingly, DAS 1802 can be deployed/realized in/by various types of CSEs, e.g., ASN-CSE, MN-CSE (like a Gateway) and IN-CSE (which could be hosted in a cloud). Accordingly, DAS implemented by different CSEs may have variant capacities/capabilities (e.g., the one deployed in the cloud could be more powerful than that deployed on a Gateway).

As mentioned earlier, no matter how the underlying technologies are added into DAS 1802, DAS 1802 will expose them to its clients with uniform service layer APIs. Accordingly, for each type of data analytic service, a Service Type Profile (STP) 2002 is defined to specify the detailed information related to Application Programming Interface (API). In other words, if a DAS 1802 has multiple types of data analytics capabilities 2004, 2006 and 2008 supported by different underlying technologies (in either plug-in or external approach), each of them will have a corresponding STP 2002. Typically, an STP 2002 is published by DAS 1802 so that the potential clients of DAS 1802 can discover the available data analytics capability provided by a DAS 1802.

In general, the working methodology of DAS 1802 is as follows: 1) various analytics service capabilities could be offered by a DAS 1802 by utilizing underlying data analytics tools/technologies; 2) for each type of data analytic capability, a STP 2002 is defined, which specifies details about this analytics capability e.g., where it is, when it is available, how long it will take for data analytics operation, what it can identify/analyze, and service access details in terms of input/output parameters, i.e., the format of the APIs that the client should use to access the service (i.e. the structure of service layer request/response messages), etc. Overall, how clients discover/refer to the STPs 2002 of a DAS 1802 and how to access corresponding DAS 1802 through uniform APIs (e.g., to send data analytics request and to receive analytical results, etc.) will normally happen over the mca/mcc/mcc' reference points and the detailed procedures will be introduced later.

An internal interface converter 2010 of the DAS 1802 can use the STPs 2002 to convert information from clients 1808 to the information used for APIs of analytics capacities 2004, 2006, and 2008.

Table 1 gives a typical definition for a STP 2002, which can be used for describing three major/popular types of data analytics operations, such as basic data statistics, text/information extraction, or image processing.

TABLE 1

| Parameters of a Service Type Profile (STP) | | |
|---|---|---|
| Common Item | Multiplicity | Description |
| Part 1: Parameters for describing the corresponding data analytics capability | | |
| CSE_ID | 1 | The "CSE_ID" is to indicate where the involved DAS of this STP is hosted on. In other words, through this attribute, the clients are able to find the portal of the DAS service for this STP. |
| Analytics_Type | 1 | The "Analytics_Type" is to indicate which type of data analytics is involved in this STP. For example, it could be basic data statistics, information extraction, or image processing, etc. |
| Avg_Processing_Time | 1 . . . N | It is possible that a data analytics operation may take certain amount of time, especially for a complicated analytics operation, the "Avg_Processing_Time" is to indicate the average processing time for the involved analytics operation of this STP. Note that, the value of this attribute may also depend on internal factors e.g., how powerful the hosting CSE is (system storage, CPU, etc) or the current working load of CSE. Similarly, it may also relates to external factor such as the size of raw data to be analysed. Accordingly, by considering all related factors, the CSE may use an algorithm to calculate/estimate the processing time for a certain size of raw data and just expose this information in STP. |
| Service_Availability | 1 | When DAS needs to leverage external data analytics portals for supporting the involved data analytics operation for this STP, it is possible that those external portals may not be always available. Since DAS itself do not have any control on those external service portals, "Service_Availability" is defined to indicate when such a service is available. Similarly, it is also possible that an analytics operation is not available even if it is executed by plug-in modules directly hooked in a CSE, if such a CSE has its own sleeping/working cycle. This is especially true for IoT devices. |
| Since different types of data analytics operations have their own characteristics, therefore, their STPs may also have different formats. Below, the specific data items will be defined for each of those different types of data analytics services. | | |
| When Analytics Type = "basic data statistics" | | |
| Supported_Statistical Operations | 1 . . . N | This item indicate which type of data statistics operations it supports. For example, the normal data aggregation can be supported by a DAS, such as Max, Min, Average, Median, etc. |
| Raw_Data_Format | 1 . . . N | This is to indicate which formats the data should be in when it is sent to the corresponding DAS for analysis, e.g., "float", "int", or "double". |

TABLE 1-continued

| Parameters of a Service Type Profile (STP) | | |
|---|---|---|
| Common Item | Multiplicity | Description |
| When Analytics Type = "information extraction" | | |
| Targeted_Information | 1 . . . N | For a data analytics service supporting text-related information extraction, it can extract useful information, e.g., the temperature value or location information from various types of documents, e.g., XML or JSON based documents. Accordingly, this item is to indicate which targeted information needs to be extracted by this service, e.g., "time", "location", "temperature", etc. |
| Raw_Data_Format | 1 . . . N | This is to indicate which formats the text document should be in when it is sent to the corresponding DAS for analysis, such as ".json", ".xml" or "text". |
| When Analytics Type = "image processing" | | |
| Identifiable_Object | 1 . . . N | Although Analytics_Type indicates which type of data analytics is involved in this STP, such as image processing in this case, it does not specify which objects this STP would like to focus on. Consider an external image processing service, it may return a batch of analytical results for a given image. For example, by analysing the image as shown in FIG. 17, the analytical results may include analytical information related to many objects in the image, such as traffic, sky, cloud, road surface, trees, etc. Since this external service may have been originally targeted for human use instead of M2M/IoT nodes, those various/random results can be understood by the human use who would then be able to further digest/process it. However, since M2M/IoT nodes are incapable of understanding complicated analytical results, instead of directly providing original analytical results yielded by an external service, an additional step for DAS is to tailor those analytical results or to restrict analytical results with a limited number of choices (therefore to facilitate M2M automatic operation). For example, a STP or its corresponding data analytics operation related to image processing may just have the functionality for identifying a limited list of specific objects, which are specified by "Identifiable Objects". In other words, this STP is only for analysing raw data in order to identify information only related to identifiable objects listed here.<br>Note that, for a raw data to be analysed, it is possible that ultimately there is no such identifiable object in the raw data, since client may just send any raw data to DAS for processing. For example, a request for a data analytics operation defined by a given STP cannot derive any meaningful analytical results if its identifiable objects only include traffic and sky but the client in fact inputs an apple fruit image for DAS to analyse. Therefore, for a given type of STP, it is also the client's responsibility to try its best to send "appropriate or reasonable" data to DAS instead of totally relying DAS to have fully-human-like intelligence.<br>For example, by using the metadata information or semantics related description of a camera, it is easy for a client to learn the location of this camera and its purpose (e.g., if it is an outdoor camera at a highway), therefore, the client needs to find an appropriate STP (e.g., the one in which sky and road traffic are its identifiable objects) for analysing the image generated by this outdoor camera. |
| Analytical_Aspects | 1 . . . N | For a given identifiable object, "Analytical Aspects" is to further indicate which analytical aspects or results will be returned by this STP. For example, for object sky, the analytical aspects could be on weather related (sunny, cloudy, etc.) or visibility related. |

TABLE 1-continued

Parameters of a Service Type Profile (STP)

| Common Item | Multiplicity | Description |
|---|---|---|
| Raw_Data_Format | 1 ... N | This is to indicate which formats the image should be in when it is sent to the corresponding DAS for analyzing, such as ".jpeg", ".png", etc. |

Part 2: Parameters for DAS Messages
(Which defines the message structure of request/response messages between clients and DAS, i.e., the uniform service access interface).

| Common Item | Multiplicity | Description |
|---|---|---|
| Input_Parameters | 1 ... N | Note that, this is the formal input parameter specification defined by DAS for the uniform interfaces exposed to its clients. Accordingly, when a client initializes a data analytic request to DAS, in the simplest case, in addition to the raw data to be analysed (which needs to follow the raw data format as defined in this STP), it may include several mandatory parameters in terms of CSE_ID, Analytics_Type as defined earlier. In the meantime, When Analytics Type = "basic data statistics" |
| | | It also needs to include the required data statistics operation as specified in the Supported Statistical Operations item. When Analytics Type = "information extraction" |
| | | It also needs to include which information is to be extracted, as specified in the Targeted Information item When Analytics Type = "image processing" |
| | | It also needs to specify which Identifiable object(s) that is(are) interested by the client and the analytical aspect(s). |
| Output_Parameters | 1 ... N | In general, the outputs will include the analytical results. When Analytics Type = "data statistics service or information extraction" |
| | | It may just return numerical analytics results, which could be in any data format, e.g., "a data string in the payload" or still in XML or JSON format. When Analytics Type = "image processing" |
| | | The analytical results are about the identifiable object(s) as specified by in the Input Parameters by the client, which may further associate with confidence intervals. The reason is that different from other data processing, for image processing/analytics, the analytical results may not be 100% true. In other words, it is possible that the result may have certain error or inaccuracy. Accordingly, a confidence interval will be associated with analytical results in order to indicate how accurate the results are. Therefore, it is up to DAS client to evaluate the precision of the results before utilizing them for further purposes. |

A number of exemplary procedures are described for interacting with DAS 1802 and those procedures are applicable for four different cases or scenarios.

Case 1 (raw data retrieved by the client): The client 1808 will first obtain its targeted/interested raw data to be analyzed, and then send it to DAS 1802 for analyzing.

Figure 21:
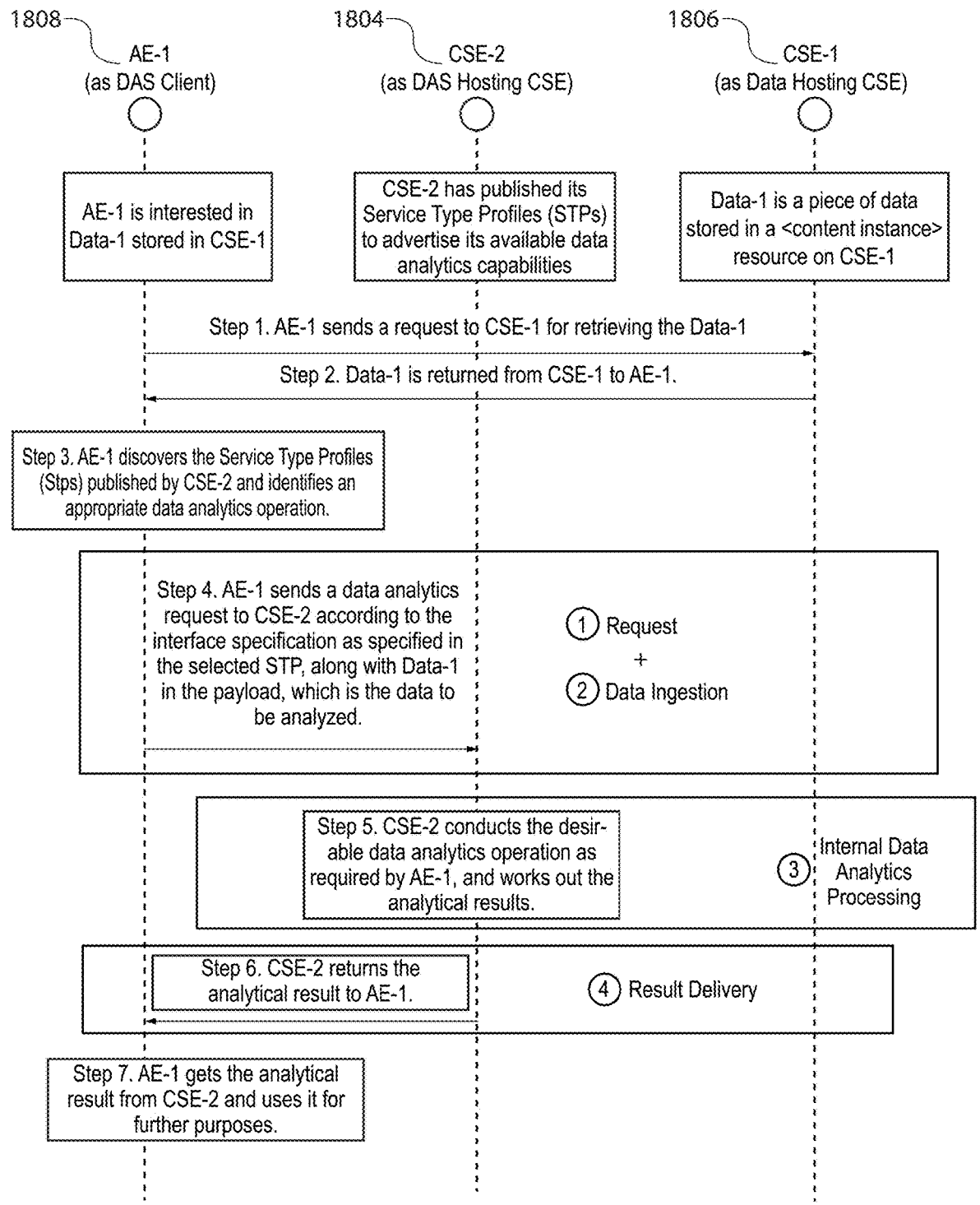
FIG. 21 is a flow chart that illustrates a first procedure for interacting with a DAS service.

FIG. 21 illustrates a procedure for interacting with DAS 1802 for Case 1 and the detailed descriptions are discussed as follows.

Precondition. Data-1 is a piece of data stored in a <contentInstance> resource on CSE-1 (as Data Hosting CSE 1806) and AE-1 (as a DAS Client 1808) is interested in Data-1. In the meantime, there is a DAS 1802 available in the system (hosted by CSE-2, which is the DAS Hosting CSE 1804) and it has published its STPs 2002 to advertise its available data analytics capabilities. For easy illustration, we consider the example scenario in which DAS Client 1808, DAS Hosting CSE 1804, Data Hosting CSE 1806 are acted by different entities, i.e., AE-1, CSE-2 and CSE-1 respectively (but in fact, as mentioned earlier, DAS Client/DAS Hosting CSE/Data Hosting CSE can also be acted by the same CSE).

In step 1 of FIG. 21, based on AE-1's interest, AE-1 sends a request to CSE-1 for retrieving Data-1. Note that, this step may be executed multiple times when AE-1 intends to collect multiple data (e.g., numerical sensor readings) from different places in order to conduct "basic data statistics" provided by DAS 1802 (e.g, calculate the average value of multiple temperature readings). For easy presentation and without losing generality, we only illustrate the case where only one piece of data needs to be analyzed at a time (which is more common for the case where information extraction or image processing type of data analytics operations are executed on e.g., a text document, or an image. More generally, Step-1 could be repeated multiple times if need to retrieving more than one piece of raw data from multiple places, e.g., from multiple <contentInstance> resources on multiple CSEs).

In step 2 of FIG. 21, Data-1 is returned from CSE-1 to AE-1. Step 1 and Step 2 are normal resource retrieval operation. Alternatively, it is also possible that AE-1 may have its own local data that needs to be analyzed. In such a case, a resource retrieval operation (Step 1 and Step 2) may be skipped.

In step 3 of FIG. 21, after getting Data-1, AE-1 finds that in order to understand or derive the valuable information in Data-1, it needs an appropriate data analytics operation. Accordingly, AE-1 discovers the STPs published by CSE-2 and identifies an appropriate data analytics operation provided by CSE-2. Such a STP publishing and discovery process can be done by using any existing service discovery mechanism.

In step 4 of FIG. 21, AE-1 sends a data analytics request to CSE-2 according to the interface specification as specified in the selected STP, along with Data-1 in the payload, which is the data to be analyzed. In particular, by referring to the "Input_Parameters" data entry as defined in the selected STP file (See Table 1 for more details), the request message sent in this step could be constructed as follows: Typically, in addition to the raw data to be analyzed (e.g., an image) which is normally carried in the payload (which needs to be complaint to the format as specified by "Raw_Data_Format" entry in the STP), the message may include the following two mandatory data analytics related parameters:

CSE_ID (cse_id): The identity of the message receiver indicates which CSE's DAS 1802 will process this data analytics request.

Analytics_Type (a_t): This data field indicates which type of data analytics operation is requested by the client. For example, it could be image processing operation, or an information extraction operation, or a basic data statistics operation, etc.

In addition, for each type of analytics service (as specified by Analytics_Type entry), it may also include the following different date entries:

When Analytics_Type="basic data statistics service":

Statistical_Operation (s_o): this item indicates which type of data statistics operations it requires, which is selected from the Supported_Statistical_Operations entry as defined in the STP. For example, the normal data aggregation can be supported by a DAS 1802, such as Max, Min, Average, Median, etc.

When Analytics_Type="information extraction":

Selected_Targeted_Information (s_t_i): For a data analytics service supporting text-related information extraction, it can attract the useful information, e.g., the temperature value or location information from various types of documents, e.g., XML or JASON based documents. Accordingly, this item is to indicate which targeted information can be extracted by using this service, e.g., "time", "location", "temperature", etc., which is selected from the Targeted_Information entry as defined in the STP.

When Analytics_Type="image processing":

Interested Object(s) (i_o): This parameter is to indicate which potential object(s) the client is interested in for this image processing operation. Note that, the interested object(s) are selected from the identifiable objects entry as defined in the selected STP.

Selected_Analytical_Aspects (s_a_a): For a certain interested object, this item is to specify which analytics aspects or results will be provided and it is selected from the Analytical_Aspects entry in the STP. For example, for sky object, the analytical aspects could be weather related (such as sunny, cloudy, etc.) or visibility related. Accordingly, based on this parameter, it indicates which kind of analytical results will be returned by DAS 1802.

In step 5 of FIG. 21, CSE-2 conducts the desired data analytics operation as required by AE-1, and works out the analytical results.

In step 6 of FIG. 21, DAS 1802 returns the analytical results to AE-1. In this step, the parameters included in the response message will be compliant to the "Output_Parameters" as defined in Table 1. For example, the message may include:

Successes Flag (s_f): This data field indicates whether the required data analytics operation has derived any analytical results. The value of this parameter can be 0 (failed) and 1 (successful). When value is 0, it basically means there is no analytical result returned, which is possible, e.g., DAS 1802 did not identify any interested object in the raw data (e.g., when a client sent an apple image to DAS 1802 and requires analytics operation defined by a STP in which the identifiable objects are only road traffic and sky).

Analytical_Result (a_r): The data field is to store the data analytics results if available. As mentioned earlier, each of the analytical result may be associated with a confidence internal for image processing type of data analytics operation. Alternatively, the analytical result can also be carried in the payload if needed.

In step 7 of FIG. 21, once AE-1 obtains the analytical results from CSE-2, it can leverage it for further purposes.

The procedure design in Case 1 is also applicable to the scenario in which e.g., DAS client 1808, DAS Hosting CSE 1804 and Data Hosting CSE 1806 are located in different nodes or at least the proximity between DAS Hosting CSE 1804 and Data Hosting CSE 1806 is larger than that between DAS client 1808 and Data Hosting CSE 1806 (i.e., it makes sense for DAS client 1808 to retrieve data from Data Hosting CSE 1806 without incurring unnecessary communication cost).

Figure 29A:
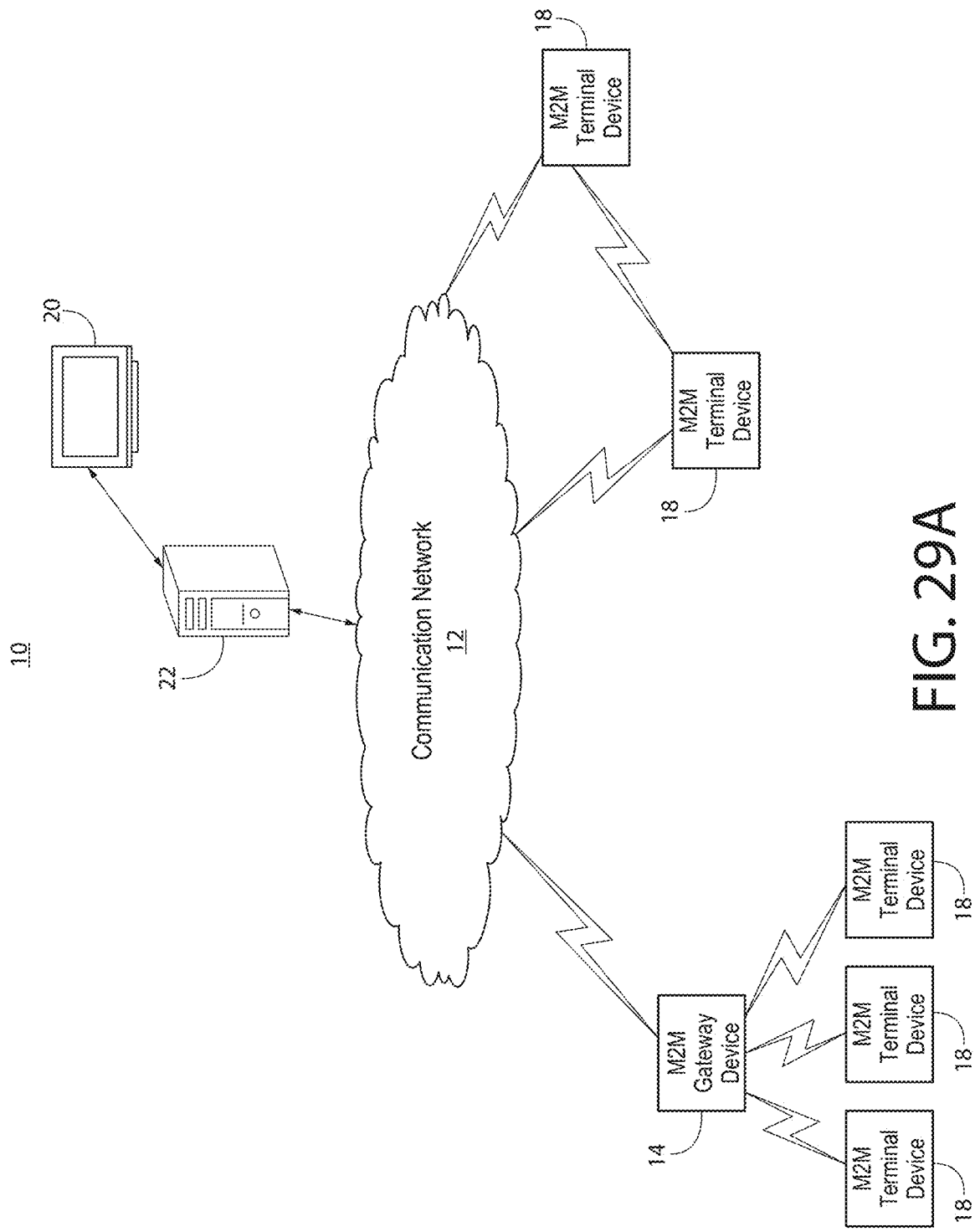
FIG. 29A is a diagram of a M2M/IoT/WoT communication system that includes a communication network.
Figure 29B:
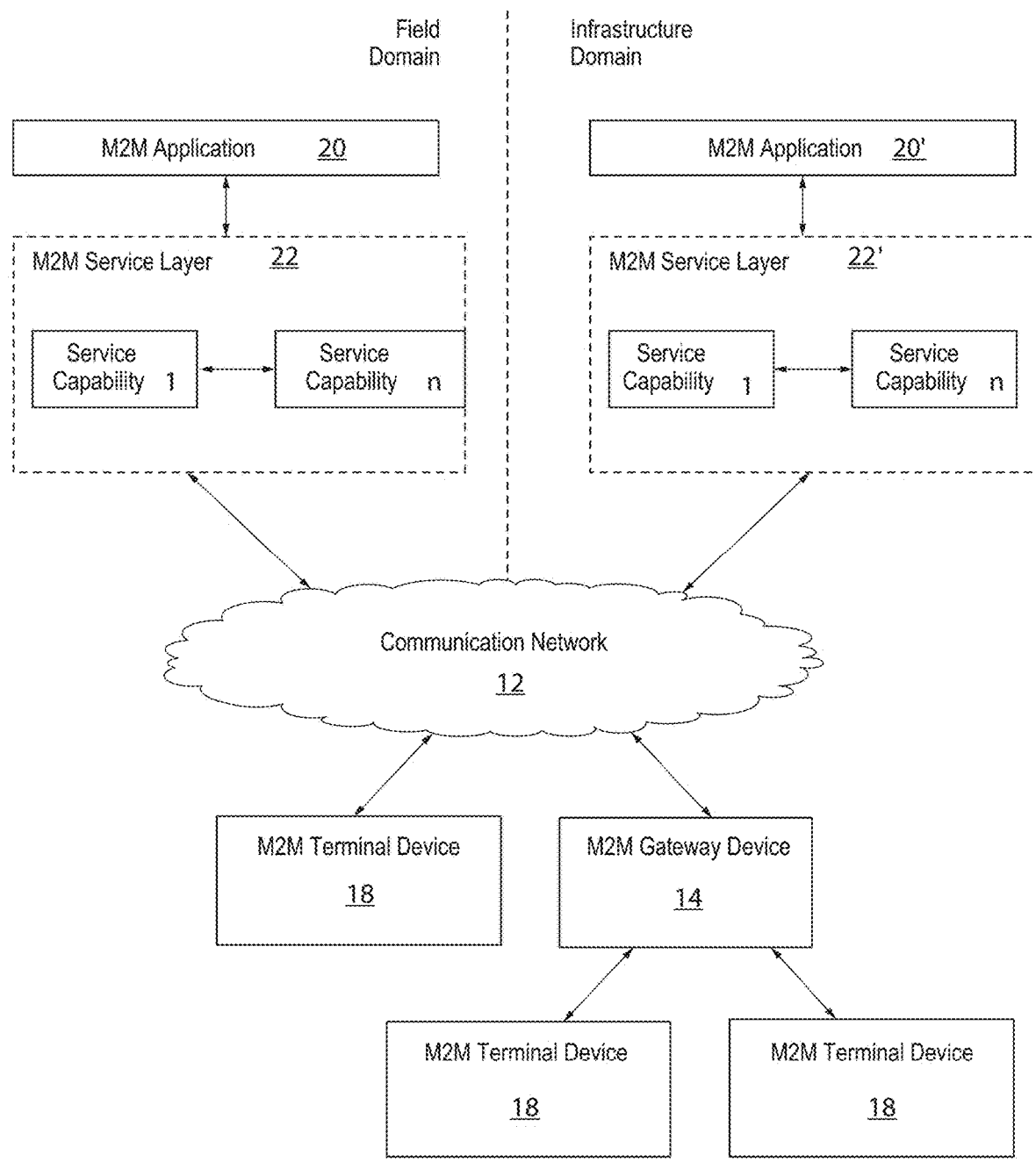
FIG. 29B is a diagram of an illustrated M2M service layer in the field domain that provides services for the M2M application, M2M gateway devices, and M2M terminal devices and the communication network.
Figure 29C:
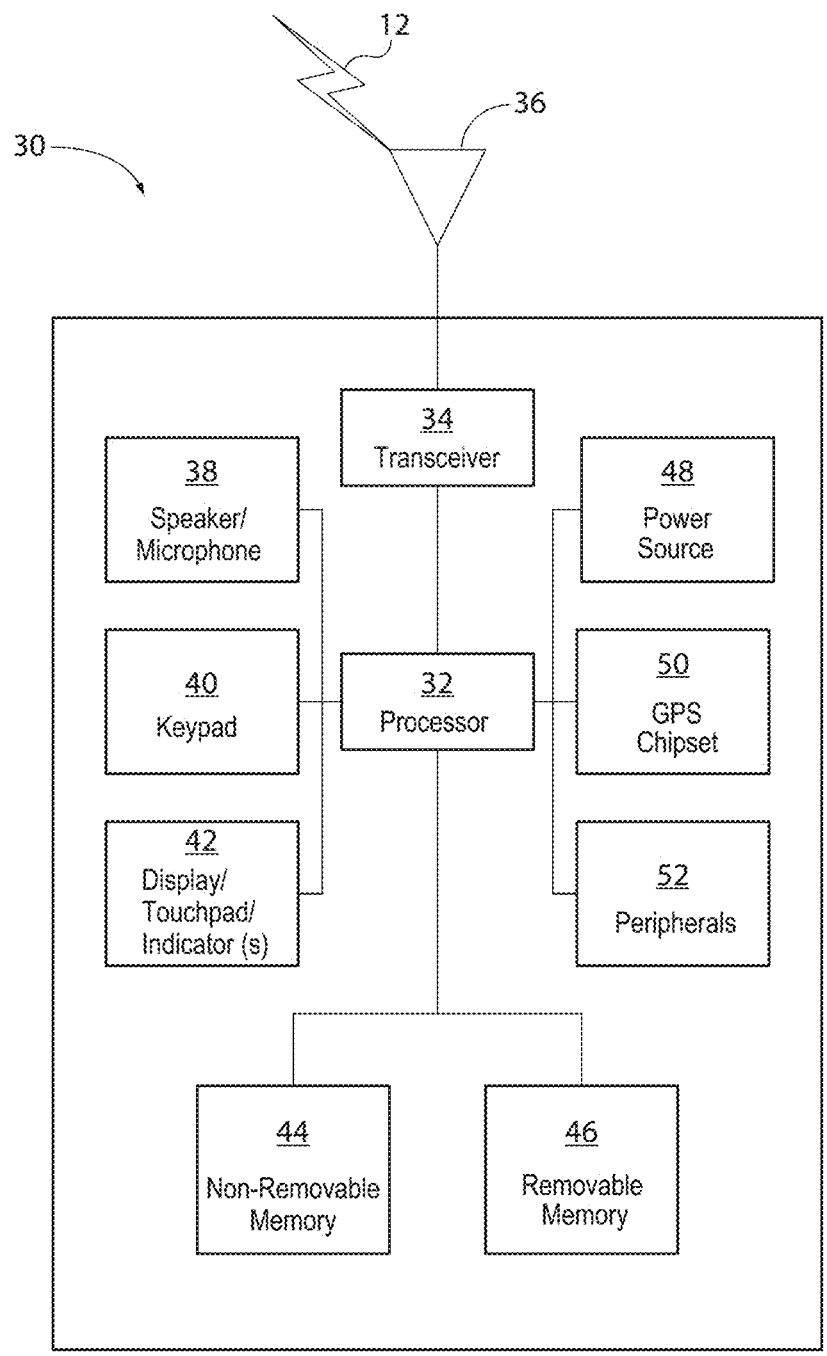
FIG. 29C is a diagram of an exemplary device that may be used to implement any of the network nodes described herein.
Figure 29D:
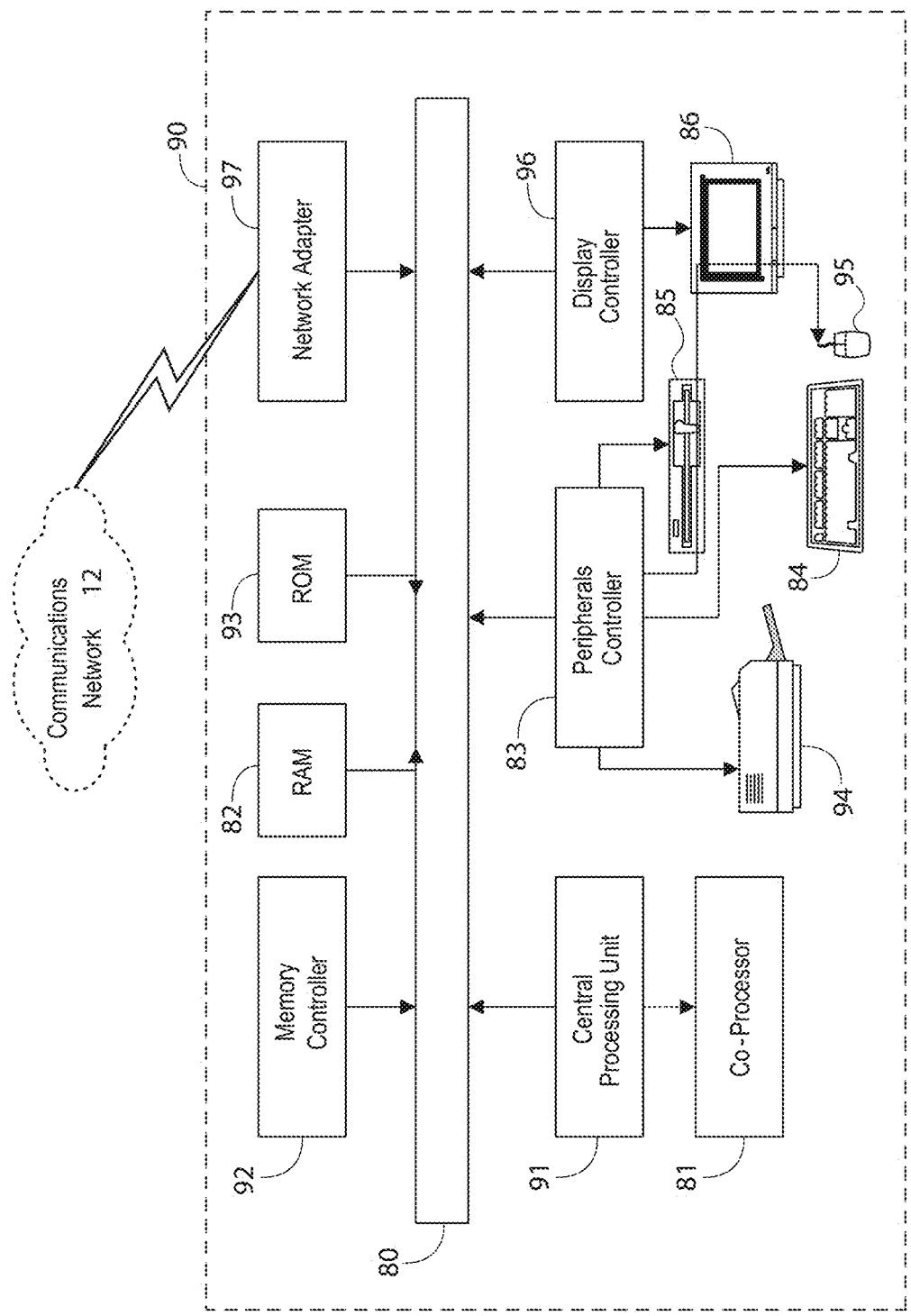
FIG. 29D is a block diagram of a computer system or server that may be used to implement any of the network nodes described herein.

It is understood that the entities performing the steps illustrated in FIG. 21 are logical entities that may be implemented in the form of software (i.e., computer-executable instructions) stored in a memory of, and executing on a processor of, a network apparatus or computer system such as those illustrated in FIG. 29C or FIG. 29D. That is, the method(s) illustrated in FIG. 21 may be implemented in the form of software (i.e., computer-executable instructions) stored in a memory of a network apparatus, such as the apparatus or computer system illustrated in FIG. 29C or FIG. 29D, which computer executable instructions, when executed by a processor of the apparatus, perform the steps illustrated in FIG. 21 It is also understood that any transmitting and receiving steps illustrated in FIG. 21 may be performed by communication circuitry of the apparatus under control of the processor of the apparatus and the computer-executable instructions (e.g., software) that it executes.

Case 2 (raw data retrieved by DAS 1802): The client will directly ask DAS 1802 for certain data analytics operation, and DAS 1802 will, on behalf of the client, retrieve the targeted/interested raw data to be analyzed.

Figure 22:
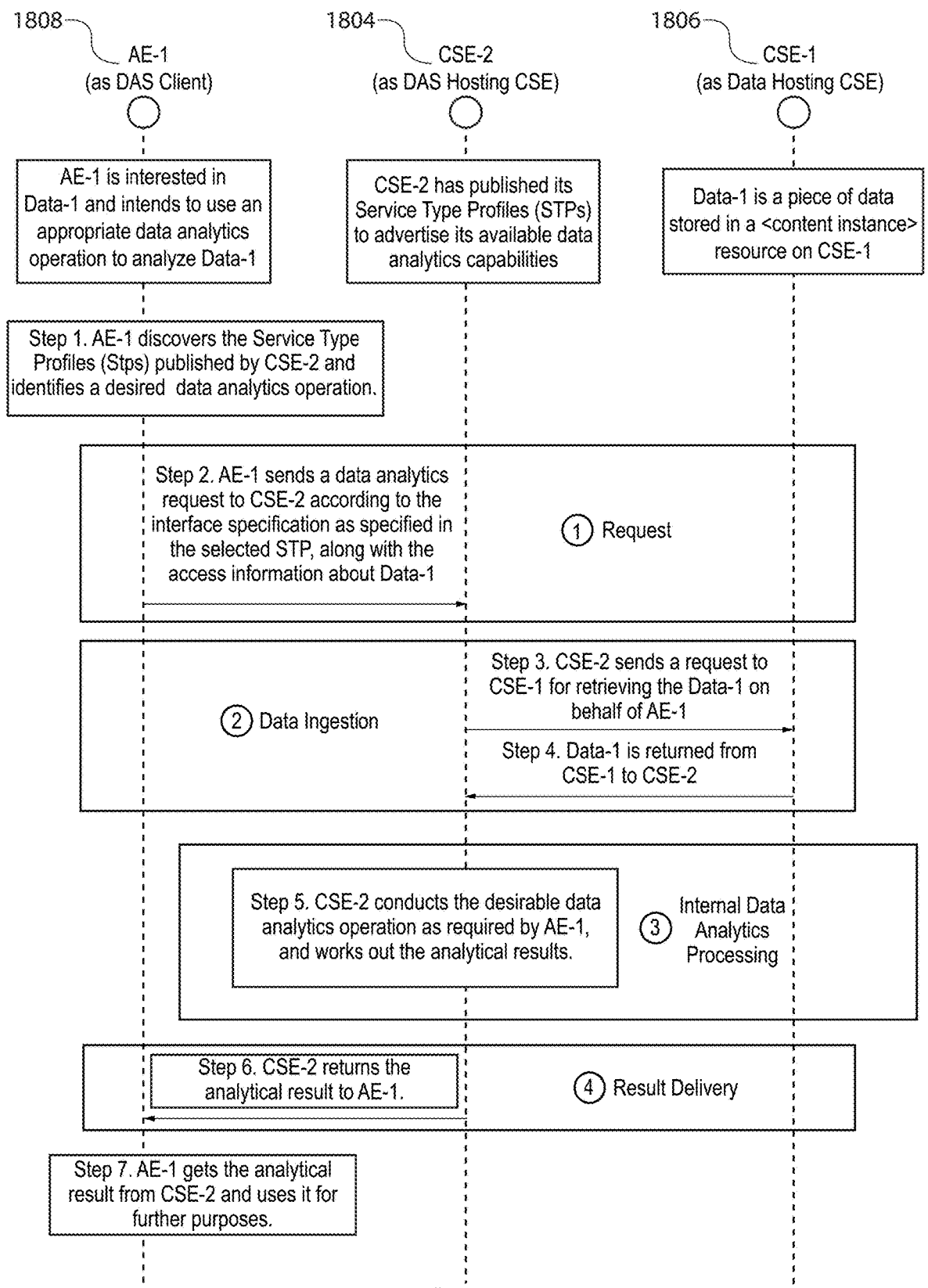
FIG. 22 is a flow chart that illustrates a second procedure for interacting with a DAS service.

FIG. 22 illustrates a procedure for interacting with DAS 1802 for Case 2 and the detailed descriptions are discussed as follows.

Precondition (same as Case 1). Data-1 is a piece of data stored in a <contentInstance> resource on CSE-1 (as Data Hosting CSE) and AE-1 (as a DAS client 1808) is interested in Data-1. In the meantime, there is a DAS available in the system (hosted by CSE-2, which is the DAS Hosting CSE) and it has published its STPs to advertise its available data analytics capabilities.

In step 1 of FIG. 22, AE-1 first discovers the STPs published by CSE-2 and identifies a desired data analytics operation.

In step 2 of FIG. 22, AE-1 sends a data analytics request to CSE-2 according to the interface specification as specified in the selected STP. In particular, by referring to the "Input_Parameters" as defined in the selected STP file (See Table 1 for more details), the request message sent in this step could be constructed as same as the Step 4 in Case 1. More than that, there could be another additional parameter as defined below:

URI_of_Data_To_Be_Analyzed (data_uri): This URI indicates where DAS can retrieve the data that is to be analyzed. Note that, although the example shown in FIG. 22 illustrates the case in which there is only one piece of data (i.e., Data-1) to be analyzed by a data analytics request, it is also possible that the required data analytics operations may retrieve multiple piece of data from different locations (especially when the data analytics type is basic data statistics operation, as discussed earlier). In that case, this parameter will include a list of URN.

In addition, AE-1 may also send related access information so that DAS can successfully access Data-1, such as access control related information.

In step 3 of FIG. 22, CSE-2 further sends a request to CSE-1 for retrieving Data-1.

In step 4 of FIG. 22, Data-1 is returned from CSE-1 to CSE-2. As same as Step 1 and Step 2 of the procedure defined for Case 1, the Step 3 and Step 4 here are also the normal resource retrieval operation.

Steps 5-7 of FIG. 22 are the same as Steps 5-7 of the procedure defined for Case 1.

Case 2 is more applicable to the scenario in which the proximity between DAS Hosting CSE 1804 and Data Hosting CSE 1806 is smaller than that between DAS client 1808 and Data Hosting CSE 1806 (i.e., it does not need DAS client 1808 to retrieve data from Data Hosting CSE 1806 in order to avoid unnecessary communication cost).

It is understood that the entities performing the steps illustrated in FIG. 22 are logical entities that may be implemented in the form of software (i.e., computer-executable instructions) stored in a memory of, and executing on a processor of, a network apparatus or computer system such as those illustrated in FIG. 29C or FIG. 29D. That is, the method(s) illustrated in FIG. 22 may be implemented in the form of software (i.e., computer-executable instructions) stored in a memory of a network apparatus, such as the apparatus or computer system illustrated in FIG. 29C or FIG. 29D, which computer executable instructions, when executed by a processor of the apparatus, perform the steps illustrated in FIG. 22 It is also understood that any transmitting and receiving steps illustrated in FIG. 22 may be performed by communication circuitry of the apparatus under control of the processor of the apparatus and the computer-executable instructions (e.g., software) that it executes.

Case 3 (Raw Data Discovered and Retrieved by DAS): Similar to Case 2, AE-1 (as DAS client 1808) will directly ask CSE-2 (as DAS Hosting CSE) for certain data analytics raw data to be analyzed. However, the difference here is that in this case, a data analytics operation can be moved and executed at a nearer DAS Hosting CSE 2302 that is closer to the raw data to be analyzed, instead of at the original DAS Hosting CSE 1804 (i.e., CSE-2) that receives the request from AE-1 (note that, "nearer" basically implies less communication overhead, so it could but not necessarily mean a nearer geo-location). It is worth noting that, from a big data perspective, this procedure is well aligned with the current data analytics processing paradigm, i.e., trying to move computing processing to where data is stored, instead of moving data to computing.

Figure 23A:
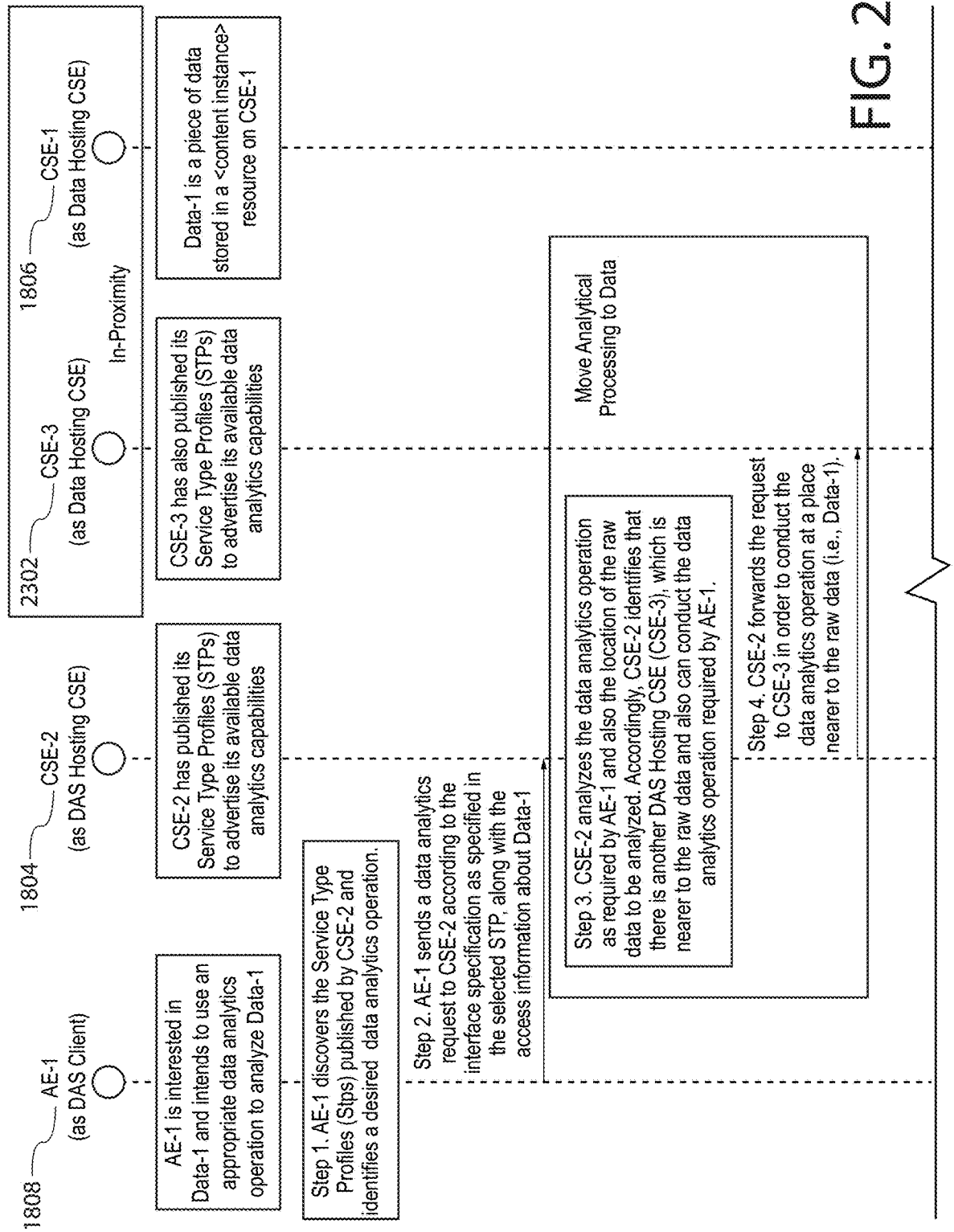
FIGS. 23A-B is a flow chart that illustrates a third procedure for interacting with a DAS service.
Figure 23B:
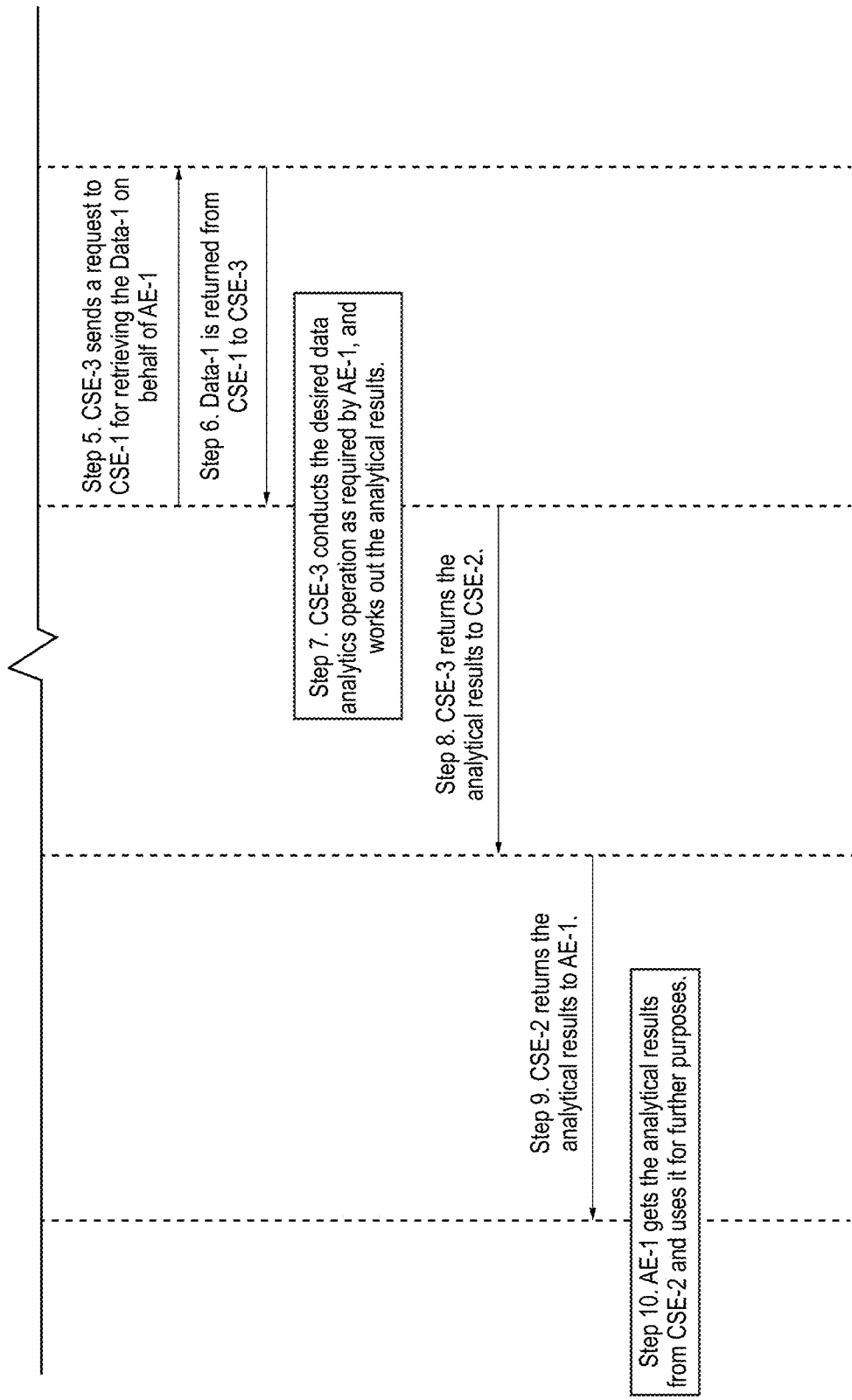

FIGS. 23A-B illustrates a procedure for interacting with DAS in Case 3. In this example scenario, we assume that CSE-2 1804 and CSE-3 2302 are located in different places and CSE-3 2302 is nearer to CSE-1 1806 than CSE-2 1804. Note that, most of steps of FIGS. 23A-B in Case 3 are as same as steps of FIG. 22 in Case 2. Here, only the difference between these two cases are discussed (as highlighted in green rectangle). As shown in FIGS. 23A-B, the Step 3 and Step 4 are defined for CSE-2 1804 to forward a data analytics request from AE-1 1808 to CSE-3 2302 since CSE-3 2302 is closer to the raw data to be analyzed. Accordingly, the data items carried in the request message of Step 2 and Step 4 of FIGS. 23A-B in Case 3 will have almost the same message as defined for Step 2 of FIG. 22 in Case 2. More than that, for the Step 4 of FIGS. 23A-B in Case 3, there could be another additional parameter as defined below:

Original_CSE_ID (original_cse_id): The data field indicates which the original DAS is that receives this data analytics request (i.e., CSE-2 in this example).

After CSE-3 2302 works out the analytical results, it will return the result to CSE-2 1804, which will further forward the result to AE-1 1808 (as illustrated in Steps 7-9 of FIGS. 23A-B). In addition, for the Step 9 of FIGS. 23A-B in Case 3, there could be another additional parameter as defined below:

Task_Execution_CSE_ID (execution_cse_id): The data field indicates which the real DAS is that conducted the data analytics processing for this request (i.e., CSE-3 2302 in this example).

Accordingly, based on this data item, the AE-1 1808 may understand that its request in fact has been processed by CSE-3 2302, although it sent to the request to CSE-2 1804. Alternatively, for future similar requests from AE-1 1808, it can directly contact CSE-3 2302, or alternatively it still can send requests to the adjacent DAS (i.e., CSE-2 1804 in this example), and let DAS to make decision where the requests should be forwarded to.

In addition, it is worth noting that although we illustrate the procedure with "proximity"-related consideration, i.e., to move the data analytics operation from the original DAS Hosting CSE 1804 to another DAS Hosting CSE 2302 which is nearer to the Data Hosting CSE. However, the procedure can also be used for any other scenarios (not necessarily taking "proximity" as a major metric). For example, as long as one DAS Hosting CSE 1804 needs to delegate certain analytics operations to other peer DAS Hosting CSEs, the procedure are all applied (e.g., for load balancing, security issue, task migration etc. purposes).

It is understood that the entities performing the steps illustrated in FIGS. 23A-B are logical entities that may be implemented in the form of software (i.e., computer-executable instructions) stored in a memory of, and executing on a processor of, a network apparatus or computer system such as those illustrated in FIG. 29C or FIG. 29D. That is, the method(s) illustrated in FIGS. 23A-B may be implemented in the form of software (i.e., computer-executable instructions) stored in a memory of a network apparatus, such as the apparatus or computer system illustrated in FIG. 29C or FIG. 29D, which computer executable instructions, when executed by a processor of the apparatus, perform the steps illustrated in FIGS. 23A-B It is also understood that any transmitting and receiving steps illustrated in FIGS. 23A-B may be performed by communication circuitry of the apparatus under control of the processor of the apparatus and the computer-executable instructions (e.g., software) that it executes.

Case 4 (Subscription-Based DAS): It is identified that there could be some unique aspects when doing data analytics operations in the context of M2M/IoT systems. For example, a stream of data could be generated by sensors or devices along time, which could be of interest to AEs or CSEs. For example, a traffic evaluation AE may intend to continually analyze the images generated by an outdoor camera on a highway. Similarly, in some situations, a client may request a data analytics operation at DAS before the raw data to be analyzed become available. Accordingly, Case 4 focuses on a subscription-based paradigm for interacting with DAS.

Figure 24A:
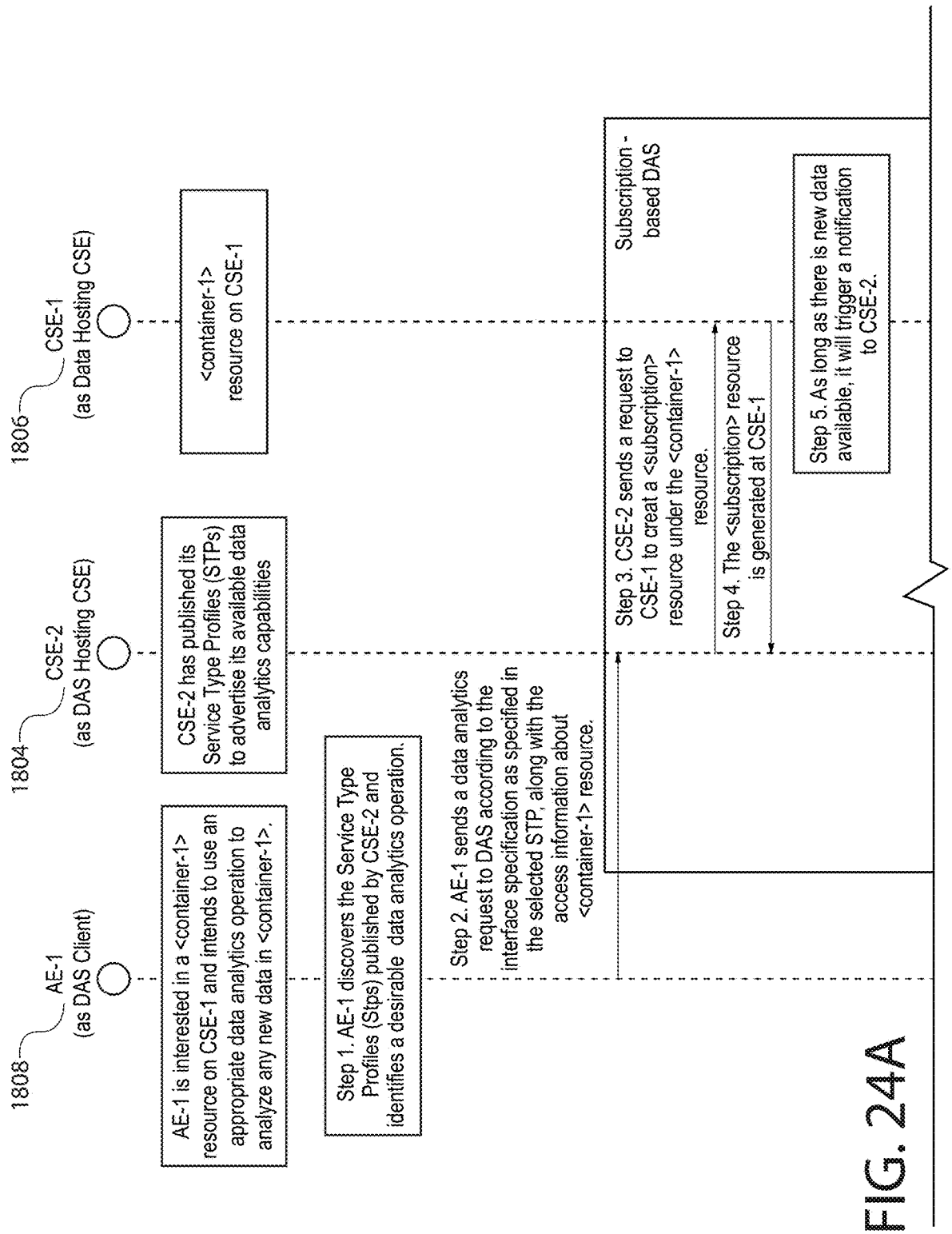

FIGS. 24A-B illustrate the procedure for interacting with DAS in Case 4. Note that, most of steps in Case 4 are as same as steps in Case 2. Here, only the differences between these two cases are discussed (as highlighted in blue rectangle). For example, instead of the DAS client 1808 being interested in a specific piece of data, in this case, AE-1 may be interested in a whole <container-1> resource on CSE-1 1806. In particular, client will be interested in new available data input into the container and require periodical data analytics operations on this data. In the meantime, the data items carried in the request message of Step 2 of FIGS. 24A-B will have almost the same message as defined for Step 2 of FIG. 22 in Case 2. More than that, there could be additional parameter as defined below:

Subscription-based operation flag (s_o): With this flag, the DAS Hosting CSE 1804 will know the the DAS client 1808 is requiring a subscription-based DAS operation. Accordingly, with this flag in this step, it means that in fact AE-1 makes a subscription for the analytics results to CSE-2.

Analytics Schedule or Frequency (s_f): The data field indicates the schedule or the frequency that the client expects DAS to conduct a data analytics operation on the new data. This is because it is possible that new data may become available in the <container> resource in a faster pace (e.g., 10 new data are generated in one minute decided by the sampling frequency of the sensing device) whereas AE-1 may just intend to have a lower analytics frequency for conducting data analytics operations on the new data (e.g., once a hour).

In addition, the Steps 3-6 of FIGS. 24A-B in Case 4 just illustrate a normal subscription operation initialized by CSE-2 1804 (i.e., the DAS Hosting CSE) in order to make notifications to CSE-2 about the new available data in the <container> resource. Accordingly, in Step 7 of FIGS. 24A-B, for each received notification, it is up to CSE-2 1804 to decide whether to retrieve the new data for analyzing by referring to the analytics frequency or schedule as specified by AE-1 1808 in Step 2 of FIGS. 24A-B. If CSE-2 1804 decides to analyze the new data, it will further retrieve the new data from CSE-1 1806 and the remaining procedure is similar to the previous cases.

The above process is using a traditional service subscription approach for DAS access. Alternatively, AE-1 1808 may also leverage oneM2M <subscription> resource to achieve the same purpose. For example, during Step 2 of FIGS. 24A-B, AE-1 1808 can create a <container> resource on DAS Hosting CSE 1804 in order to store analytical results. In the meantime, it also creates a <subscription> resource under this <container> resource. Accordingly, on the DAS side, as same as Step 10 of FIGS. 24A-B, it can conduct the desired data analytics operations based on AE-1's needs and then put those analytics results as <contentInstance> resources into the <container> resource, which will further trigger notifications to be sent to AE-1 1808 (e.g., according to certain notification criteria set by AE-1 1808).

Figure 25:
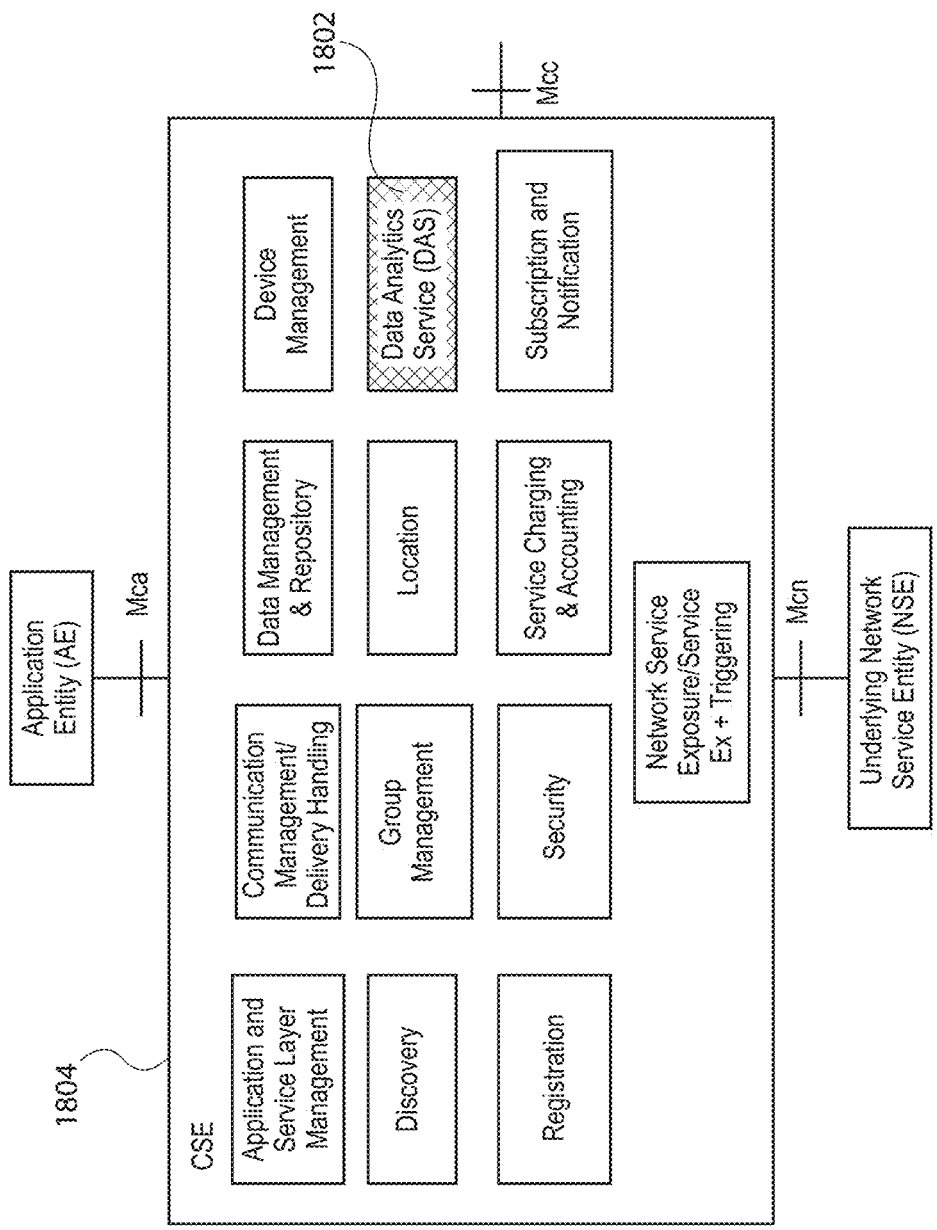
FIG. 25 is a diagram that illustrates a new DAS CSF for oneM2M service layer.

It is understood that the entities performing the steps illustrated in FIGS. 24A-B are logical entities that may be implemented in the form of software (i.e., computer-executable instructions) stored in a memory of, and executing on a processor of, a network apparatus or computer system such as those illustrated in FIG. 29C or FIG. 29D. That is, the method(s) illustrated in FIGS. 24A-B may be implemented in the form of software (i.e., computer-executable instructions) stored in a memory of a network apparatus, such as the apparatus or computer system illustrated in FIG. 29C or FIG. 29D, which computer executable instructions, when executed by a processor of the apparatus, perform the steps illustrated in FIGS. 24A-B It is also understood that any transmitting and receiving steps illustrated in FIGS. 24A-B may be performed by communication circuitry of the apparatus under control of the processor of the apparatus and the computer-executable instructions (e.g., software) that it executes.

oneM2M is currently in the process of defining capabilities supported by the oneM2M service layer. These capabilities are referred to as Capability Service Functions (CSFs). The oneM2M service layer is referred to as a Capability Services Entity (CSE). Accordingly, the DAS could be regarded as a CSF implemented by a CSE, as shown in FIG. 25 (Alternatively, it can also be part of the existing Data Management and Repository (DMR) CSF defined in oneM2M TS-0001). Accordingly, the procedure as well as the new parameters mainly happen on mca and mcc/mcc' reference point as illustrated in FIG. 25. It should be that, different types of M2M nodes can implement DAS, such as M2M Gateway, M2M Server, M2M Devices, etc. In particular, depending on the various/different hardware/software capacities for those nodes, the functionalities/capacities of DASs implemented by those nodes may also be variant.

It is understood that the functionality illustrated in FIG. 25, may be implemented in the form of software (i.e., computer-executable instructions) stored in a memory of, and executing on a processor of, a node of an M2M network (e.g., a server, gateway, device, or other computer system), such as one of those illustrated in FIG. 29C or 29D described below.

Figures 26, 27:
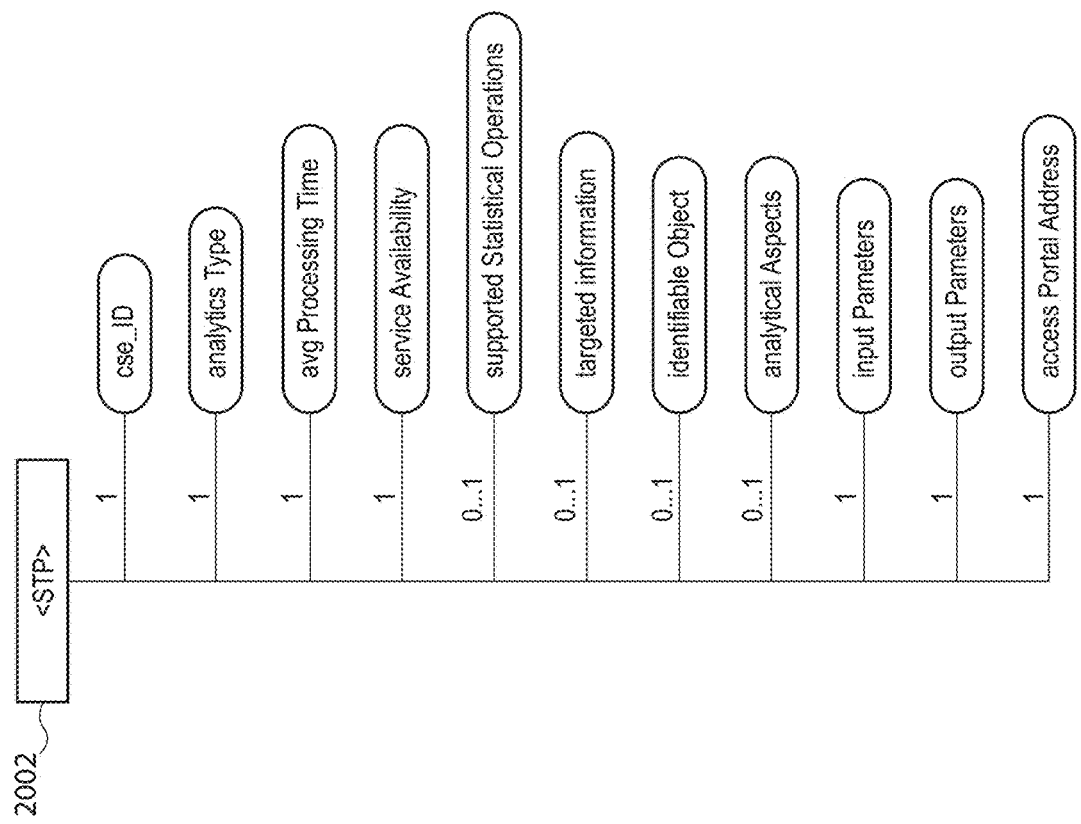
FIG. 26 is a diagram that illustrates an STP oneM2M Resource.
FIG. 27 is a diagram that illustrates a DAS oneM2M Resource.

Two new oneM2M resources are defined in order to enable DAS. In particular, since service type profiles are defined to be exposed to potential clients of DAS, a new resource called <STP> is used to describe a STP 2002, which is shown in FIG. 26. Accordingly, by accessing those <STP> resources, the clients can easily understand which data analytics operations are available. In the meantime, such <STP> resources can be published at different CSEs in the network in order to facilitate discovery of the DAS clients. In particular, the "accessPortalAddress" attribute defined in this resource is to indicate how to really access this corresponding DAS for this STP 2002 (i.e., where to send the request message to the DAS Hosting CSE 1804). Accordingly, a new resource called <DAS> is used shown in FIG. 27, which is normally as a child resource of the DAS Hosting CSE 1804 and the URI of this resource will be included in the previously-mentioned accessPortalAddress attribute of the corresponding <STP> resource. Since <DAS> is just an access portal, it could just include common attributes for service layer resources, which is not shown in FIG. 27. Accordingly, all the requests of DAS clients (as well as the raw data to be analyzed which is normally stored in the <contentInstance> resources) will be sent to the address specified by the "accessPortalAddress" attribute and those requests can use either CREATE or UPDATE requests as defined in the service layer (UPDATE is suggested since there will no new resource to be created when sending data analytics requests to a DAS). In addition, the resource structure of <STP> is based on the definition of STP 2002 and the meanings of attributes of <STP> resource are as same as those introduced in Table 1.

Interfaces, such as Graphical User Interfaces (GUIs), can be used to assist user to control and/or configure functionalities related to enabling Data Analytics. As introduced above, a new DAS common service is used for a Service Layer. In particular, in order for a human administrator to monitor how those DAS services are running, FIG. 28A shows a GUI 2802 for checking the whole system view. For example, human could be allowed to examine a specific type of data analytics operation run by DAS, e.g., image processing, or information extraction, etc. (e.g., by inputting the specific types of data analytics operation that the user intends to check as shown in FIG. 28A or alternatively let users pick options from various data analytics operations via a dropdown). In addition, human administrator could monitor whether the underlying data analytics components are working properly. In the meantime, since each type of data analytics operation are exposed through STPs 2002, the GUI 2802 also allow administrator to examine the details of STPs 2002, especially for those dynamically-changing data items in STP 2002, such as the service availability and statistical information on the confidence interval of the analytical results. In addition, it also allows the administrator to check for each specific STP 2002, which clients have accessed and used them in order to understand the utilization ratio of various types of data analytics operations provided by DAS. For example, FIG. 28B shows an output panel interface 2804 when the administrator selected to check an image-processing type of STP 2002, in which the details of this STP 2002 has been displayed to the user for their reference. It is to be understood that interfaces 2802 and 2804 can be produced using displays such as those shown in FIGS. 29C-D described below.

Example M2M/IoT/WoT Communication System for Data Analytics Service

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 29A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804.

As shown in FIG. 29A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 29B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804. The M2M service layer 22 may be implemented by one or more servers, computers, devices, virtual machines (e.g. cloud/storage farms, etc.) or the like, including for example the devices illustrated in FIGS. 29C and 29D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 29B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804 may be hosted within a M2M service layer instance hosted by an M2M node, such as an M2M server, M2M gateway, or M2M device, as shown in FIG. 29B. For example, the logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 29C or FIG. 29D described below.

Further, logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804 can implemented as part of an M2M network that uses a Service Oriented Architecture (SOA) and/or a Resource-Oriented Architecture (ROA) to access services of the present application.

FIG. 29C is a block diagram of an example hardware/software architecture of a M2M network node 30, such as an M2M device 18, an M2M gateway 14, an M2M server, or the like. The node 30 can execute or include logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804. The device 30 can be part of an M2M network as shown in FIG. 29A-B or part of a non-M2M network. As shown in FIG. 29C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 29C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims.

While FIG. 29C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 29C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 29D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 29A and FIG. 29B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 29A-B or the device 30 of FIG. 29 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as M2M area network, 1104 M2M gateway, M2M server, service layer 1202, Common Services Entity (CSE) 1402, Application Entity (AE) 1404, camera 1702, Gateway 1704, Data Analytics Service (DAS) 1802, DAS hosting CSE 1804 and 2302, Data Hosting CSE 1806, DAS clients 1808, Service Type Profile (STP) 2002, analytics capacity 2004, 2006, and 2008, and logical entities to create interfaces such as interfaces 2802 and 2804 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

The invention claimed is:

1. A method performed by a service entity for a service supporting service capabilities through a set of application programming interfaces (APIs) in a network, the method comprising:

receiving, from an application entity via the network, a request to perform a data analytics operation on data, the request identifying a type of data analytics capability capable of performing the requested data analytics operation, the request further comprising one or more parameters required by the identified type of data analytics capability, the required parameters being specified in a profile defined for the identified type of data analytics capability, wherein the profile defined for the identified type of data analytics capability further comprises a mapping to an interface of a data analytics capability of the identified type;

determining a first data host entity of a plurality of data host entities in the service storing the data on which the requested data analytics operation is to be performed, wherein each of the plurality of data host entities is a uniquely addressable element in resource oriented architecture via RESTful methods using uniform resource identifiers (URIs);

transmitting a message corresponding to the received request to a second service entity for the service in the network, the second service entity for the service having a closer proximity to the first data host entity, and wherein the second service entity is configured to request the data from the first data host entity; and receiving, from the second service entity, a response to the requested data analytics operation on the data, wherein results of the requested data analytics operation are available for the application entity via the set of APIs.

2. The method of claim 1, wherein the received request further comprises the data on which the data analytics operation is to be performed.

3. The method of claim 1, further comprising retrieving, based on the URIs, the data on which the data analytics operation is to be performed.

4. The method of claim 1, wherein the method is performed by a data analytics service of the service.

5. The method of claim 4, wherein the data analytics service interfaces with a plurality of different types of analytics capabilities.

6. The method of claim 5, further comprising converting, based on the profile of the identified type of data analytics capability, the received request into a request that conforms to an application programming interface of a data analytics capability of the identified type, wherein the converting is performed by an interface converter of the data analytics service that interfaces with the data analytics capability of the identified type.

7. The method of claim 1, wherein the requested data analytics operation is performed by the identified type of data analytics capability in accordance with a subscription associated with the requested data analytics operation.

8. The method of claim 1, wherein the service is provided as a middleware service for IoT services.

9. The method of claim 8, wherein the middleware service is a service layer located on top of network protocol stacks.

10. The method of claim 9, wherein the service layer is defined according to ETSI/oneM2M standards.

11. An apparatus comprising one or more processors and one or more memories, the apparatus further comprising computer-executable instructions stored in the one or more memories of the apparatus which, when executed by the one or more processors of the apparatus, cause the apparatus to perform, at a service supporting service capabilities through a set of application programming interfaces (APIs) in a network, operations comprising:

receiving, from an application entity via the network, a request to perform a data analytics operation on data, the request identifying a type of data analytics capability capable of performing the requested data analytics operation, the request further comprising one or more parameters required by the identified type of data analytics capability, the required parameters being specified in a profile defined for the identified type of data analytics capability, wherein the profile defined for the identified type of data analytics capability further comprises a mapping to an interface of a data analytics capability of the identified type;

determining a first data host entity of a plurality of data host entities in the service storing the data on which the requested data analytics operation is to be performed, wherein each of the plurality of data host entities is a uniquely addressable element in resource oriented architecture via RESTful methods using uniform resource identifiers (URIs);

transmitting a message corresponding to the received request to a second service entity for the service in the network, the second service entity for the service having a closer proximity to the first data host entity, and wherein the second service entity is configured to request the data from the first data host entity; and receiving, from the second service entity, a response to the requested data analytics operation on the data, wherein results of the requested data analytics operation are available for the application entity via the set of APIs.

12. The apparatus of claim 11, wherein the received request further comprises the data on which the data analytics operation is to be performed.

13. The apparatus of claim 11, wherein the computer-executable instructions further cause the apparatus to retrieve, based on the URIs, the data on which the data analytics operation is to be performed.

14. The apparatus of claim 11, wherein the computer-executable instructions further cause the apparatus to implement a data analytics service of the service of the network, which data analytics service performs said operations.

15. The apparatus of claim 14, wherein the data analytics service interfaces with a plurality of different types of analytics capabilities.

16. The apparatus of claim 15, wherein the computer-executable instructions further cause the apparatus to convert, based on the profile of the identified type of data analytics capability, the received request into a request that conforms to an application programming interface of a data analytics capability of the identified type, wherein the converting is performed by an interface converter of the data analytics service that interfaces with the data analytics capability of the identified type.

17. The apparatus of claim 11, wherein the requested data analytics operation is performed at the second service entity for the service by the identified type of data analytics capability in accordance with a subscription associated with the requested data analytics operation.

18. The apparatus of claim 11, wherein the service is provided as a middleware service for IoT services.

19. The apparatus of claim 18, wherein the middleware service is a service layer located on top of network protocol stacks.

20. The apparatus of claim 19, wherein the service layer is defined according to ETSI/oneM2M standards.

* * * * *